US012802301B2

(12) United States Patent
Hu

(10) Patent No.: US 12,802,301 B2
(45) Date of Patent: Nov. 17, 2026

(54) POLYGON PROCESSING METHODS AND SYSTEMS

(71) Applicant: Tencent Technology (Shenzhen) Company Limited, Shenzhen (CN)

(72) Inventor: Kaimo Hu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 218 days.

(21) Appl. No.: 18/598,676

(22) Filed: Mar. 7, 2024

(65) Prior Publication Data

US 2024/0212236 A1 Jun. 27, 2024

Related U.S. Application Data

(63) Continuation of application No. PCT/CN2023/117252, filed on Sep. 6, 2023.

(30) Foreign Application Priority Data

Sep. 20, 2022 (CN) ......................... 202211141045.1

(51) Int. Cl.
*G06T 11/23* (2026.01)
*A63F 13/52* (2014.01)
(Continued)

(52) U.S. Cl.
CPC .............. *G06T 11/23* (2026.01); *A63F 13/52* (2014.09); *G06T 7/11* (2017.01); *G06T 7/246* (2017.01);
(Continued)

(58) Field of Classification Search
CPC ......... G06T 11/203; G06T 7/11; G06T 7/246; G06T 7/50; G06T 7/60; G06T 11/60;
(Continued)

(56) References Cited

U.S. PATENT DOCUMENTS 6,943,790 B2 * 9/2005 Taubin .................... G06T 17/20 345/420
2004/0070586 A1 4/2004 Taubin
(Continued)

FOREIGN PATENT DOCUMENTS

CN 108520121 A 9/2018
CN 109410213 A 3/2019
(Continued)

*Primary Examiner* — David T Welch
(74) *Attorney, Agent, or Firm* — Banner & Witcoff, Ltd.

(57) ABSTRACT

This application provides a polygon processing method and apparatus, a device, a computer-readable storage medium, and a computer program product. The method includes: obtaining a to-be-processed original polygon, and determining a first target bounding box of the original polygon; determining a motion vector based on the first target bounding box, and moving the original polygon and the first target bounding box based on the motion vector; determining a second target bounding box of an original polygon obtained after movement, a lower left vertex of the second target bounding box being a coordinate origin, and dividing the second target bounding box into a plurality of squares; determining a square among the plurality of squares that has an intersection region with the original polygon obtained after movement as a target square, and generating a target polygon based on connecting sides of the target square; and moving the target polygon to a position corresponding to the original polygon based on the motion vector.

24 Claims, 7 Drawing Sheets

(51) Int. Cl.

| | |
|---|---|
| ***G06T 7/11*** | (2017.01) |
| ***G06T 7/246*** | (2017.01) |
| ***G06T 7/50*** | (2017.01) |
| ***G06T 7/60*** | (2017.01) |
| ***G06T 11/60*** | (2026.01) |

(52) U.S. Cl.
CPC .................. *G06T 7/50* (2017.01); *G06T 7/60* (2013.01); *G06T 11/60* (2013.01); *G06T 2207/20021* (2013.01); *G06T 2210/12* (2013.01); *G06T 2210/21* (2013.01)

(58) Field of Classification Search
CPC ....... G06T 2207/20021; G06T 2210/12; G06T 2210/21; A63F 13/52
USPC .......................................................... 345/647
See application file for complete search history.

(56) References Cited

U.S. PATENT DOCUMENTS

| | | | | |
|---|---|---|---|---|
| 2012/0218264 | A1* | 8/2012 | Clarberg | G06T 5/70 345/420 |
| 2017/0309027 | A1* | 10/2017 | Kleen | G06T 17/20 |
| 2021/0027533 | A1* | 1/2021 | Ruud | G06T 11/40 |
| 2021/0067776 | A1* | 3/2021 | Reuze | H04N 19/573 |
| 2024/0095993 | A1* | 3/2024 | Muthler | G06T 15/005 |
| 2024/0095995 | A1* | 3/2024 | Muthler | G06T 15/30 |

FOREIGN PATENT DOCUMENTS

| | | | |
|---|---|---|---|
| CN | 114219916 | A | 3/2022 |
| CN | 114266800 | A | 4/2022 |
| CN | 115222806 | A | 10/2022 |

* cited by examiner

POLYGON PROCESSING METHODS AND SYSTEMS

RELATED APPLICATION

This application claims priority to PCT/CN2023/117252, filed Sep. 6, 2023, which claims priority to the Chinese Patent Application No. 202211141045.1, filed Sep. 20, 2022, each of which is incorporated herein by reference in its entirety.

FIELD OF THE TECHNOLOGY

This application relates to the field of data processing technologies, and in particular, to a polygon processing method and apparatus, a device, a computer-readable storage medium, and a computer program product.

BACKGROUND OF THE DISCLOSURE

In applications related to processing on a polygon with holes, there is a widespread requirement: Specific approximation processing is performed on an original shape to obtain an approximate shape, and then the approximate shape is used as an input to obtain an approximate result of algorithm execution, and then further processing is performed on the approximate result to obtain a final result, or the approximate result is directly used as the final result. For example, for a polygon collision detection problem, a convex hull of a polygon is first calculated, then the convex hull is used as an input of a collision detection algorithm to filter out a large number of polygons that are unlikely to collide (the principle is: if the convex hulls of two polygons do not intersect with each other, it is impossible for original polygons to intersect with each other), and finally only polygons whose convex hulls intersect with each other are detected. Practice shows that this is a very effective means to improve computing efficiency.

The key lies in a method of performing approximation processing on an original shape to obtain an approximate shape. In the related art, different types of approximate shapes need to be generated for different application requirements, so that different polygon approximation processing methods need to be provided for the different application requirements.

SUMMARY

Aspects of this application provide a polygon processing method and apparatus, a computer-readable storage medium, and a computer program product that can approximate an original polygon into a target polygon whose connecting sides are all horizontally or vertically straight, thereby improving a processing speed of a polygon geometry processing algorithm.

The technical solutions of the aspects of this application may be implemented as follows:

An aspect of this application provides a polygon processing method, applied to a computer device, and including:

obtaining a to-be-processed original polygon, and determining a first target bounding box of the original polygon;

determining a motion vector based on the first target bounding box, and moving the original polygon and the first target bounding box based on the motion vector;

determining a second target bounding box of an original polygon obtained after movement, and dividing the second target bounding box into a plurality of squares, a lower left vertex of the second target bounding box being a coordinate origin;

determining a square among the plurality of squares that has an intersection region with the original polygon obtained after movement as a target square, and generating a target polygon based on connecting sides of the target square; and moving the target polygon to a position corresponding to the original polygon based on the motion vector.

An aspect of this application provides a polygon processing apparatus, including:

a first determining module, configured to obtain a to-be-processed original polygon, and determine a first target bounding box of the original polygon;

a first moving module, configured to determine a motion vector based on the first target bounding box, and move the original polygon and the first target bounding box based on the motion vector;

a second determining module, configured to determine a second target bounding box of an original polygon obtained after movement, and divide the second target bounding box into a plurality of squares, a lower left vertex of the second target bounding box being a coordinate origin;

a polygon generation module, configured to determine a square among the plurality of squares that has an intersection region with the original polygon obtained after movement as a target square, and generate a target polygon based on connecting sides of the target square; and a second moving module, configured to move the target polygon to a position corresponding to the original polygon based on the motion vector.

An aspect of this application provides a computer device, including:

a memory, configured to store executable instructions; and a processor, configured to implement, when executing the executable instructions stored in the memory, the polygon processing method provided in an aspect of this application.

An aspect of this application provides a computer-readable storage medium storing executable instructions, the executable instructions, when executed by a processor, causing the processor to perform the polygon processing method provided in this aspect of this application.

An aspect of this application provides a computer program product, including a computer program or instructions, when the computer program or the instructions is executed by a processor, implementing the polygon processing method provided in this aspect of this application.

The aspects of this application have the following beneficial effects:

In the polygon processing method provided in the aspects of this application, after a to-be-processed original polygon is obtained, a first target bounding box of the original polygon is first determined, then a motion vector is determined based on the first target bounding box, and the original polygon and the first target bounding box are moved based on the motion vector. Then, a second target bounding box of an original polygon obtained after movement is determined, and a lower left vertex of the second target bounding box is a coordinate origin, and then the second target bounding box is divided into a plurality of squares. A square among the plurality of squares that has an intersection region with the original polygon obtained after movement is determined as a target square, a target polygon is generated based on a connecting side of the target square, and finally the target polygon is moved to a position corresponding to the original polygon based on the motion vector. Since the lower left vertex of the second target bounding box is the coordinate origin, and two connecting sides of the second target bounding box coincide with an x-axis and a y-axis respectively, the connecting sides of the plurality of squares divided by the second target bounding box are also parallel to the x-axis or the y-axis. Further, the connecting side of the target polygon is the connecting side of the target square. That is to say, each connecting side of the target polygon is parallel to the x-axis or the y-axis, that is, they are all horizontally or vertically straight, which can improve the execution efficiency and robustness of executing geometric algorithm using the target polygon.

DESCRIPTION OF EMBODIMENTS

Figure 1:
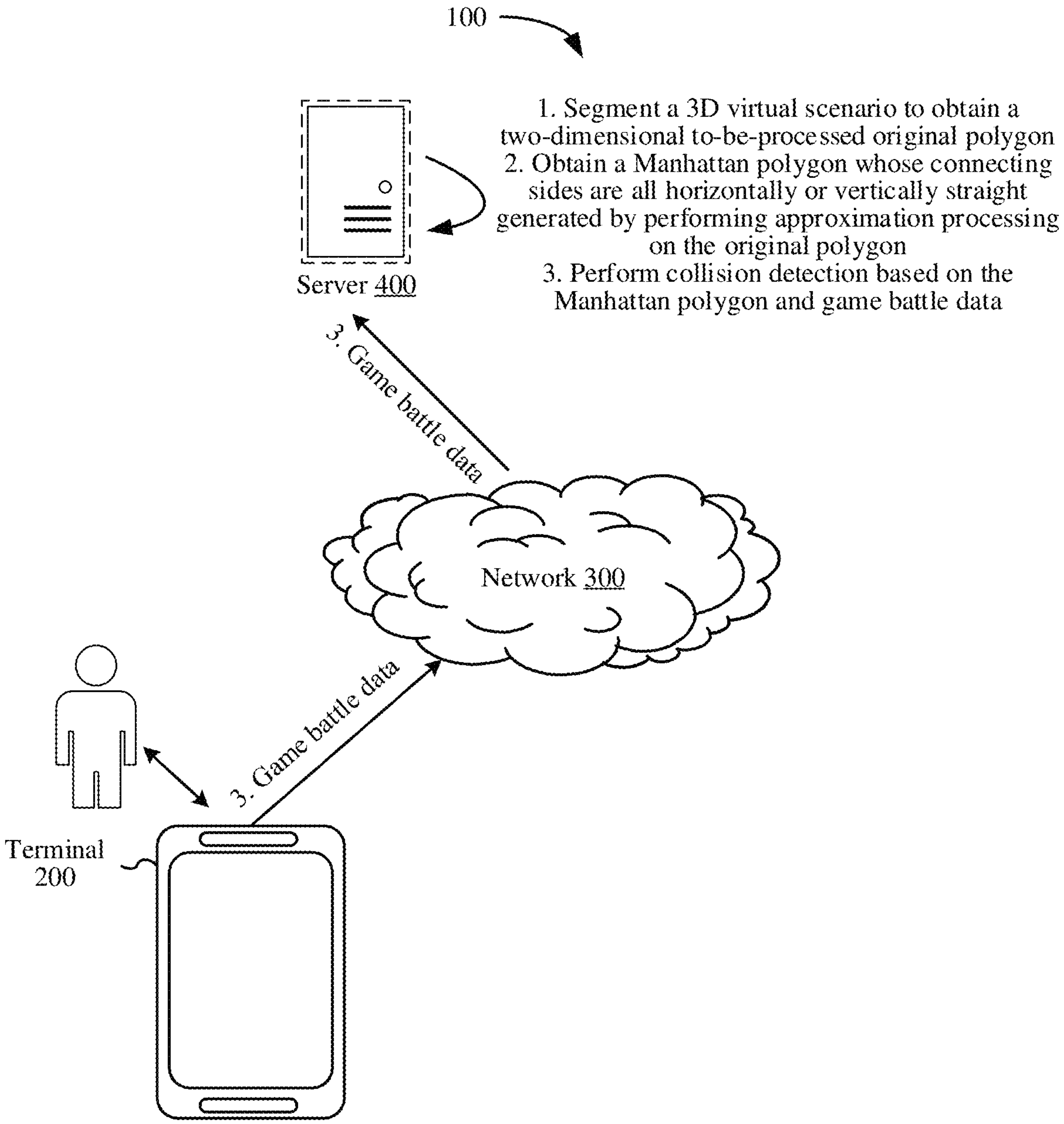
FIG. 1 is a schematic diagram of an architecture of a game system 100 according to one or more illustrative aspects described herein.

To make the objectives, technical solutions, and advantages of this application clearer, the following describes this application in further detail with reference to the accompanying drawings. The described aspects are not to be considered as a limitation to this application. All other aspects obtained by a person of ordinary skill in the art without creative efforts shall fall within the protection scope of this application.

In the following descriptions, related "some aspects" describe a subset of all possible aspects. However, it may be understood that the "some aspects" may be the same subset or different subsets of all the possible aspects, and may be combined with each other without conflict.

In the following descriptions, the included term "first/second/third" is merely intended to distinguish similar objects but does not necessarily indicate a specific order of an object. It may be understood that "first/second/third" is interchangeable in terms of a specific order or sequence if permitted, so that the aspects of this application described herein can be implemented in a sequence in addition to the sequence shown or described herein.

Unless otherwise defined, meanings of all technical and scientific terms used in this specification are the same as those usually understood by a person skilled in the art to which this application belongs. Terms used in this specification are merely intended to describe objectives of the aspects of this application, but are not intended to limit this application.

Before the aspects of this application are further described in detail, nouns and terms involved in the aspects of this application are described. The nouns and terms provided in the aspects of this application are applicable to the following explanations.

1) Polygon: It is a closed plane figure formed by three or more directed line segments connected end to end. It is generally agreed that a right side of a directed line segment is the interior of the polygon and a left side is the exterior of the polygon. Therefore, vertices of a polygon with a finite area are generally arranged in a counterclockwise direction.

2) Manhattan Polygon: A polygon with all sides meeting a horizontally or vertically straight property is referred to as a Manhattan polygon.

3) Polygon with holes: It includes an outer boundary (formed by polygons arranged counterclockwise) and several holes (formed by polygons with vertices arranged clockwise) included inside the outer boundary, and can represent a connected area on a plane.

4) General Manhattan polygon with holes: A polygon with holes whose outer boundary and all internal holes are Manhattan polygons is referred to as a Manhattan polygon with holes.

5) Coordinates represented exactly: It means that coordinate values in space can be exactly represented by a numerical system in a computer without precision errors. In the aspects of this application, the coordinates represented exactly means that the coordinate values can be exactly represented using commonly used floating point numbers. Generally, a real number whose decimal part has a form of $2^n$($n \in \mathbb{Z}^-$) can be exactly represented by a floating point number.

6) Polylines: It is an unclosed plane figure formed by several line segments connected end to end.

7) Packing problem: The packing problem defined in this specification refers to a process of arranging a plurality of polygons (with holes) compactly in a texture space and making utilization of the texture space as high as possible.

8) Level of detail (LOD): In the field of computer graphics, the level of detail gradually decreases as an object or a model moves away from a viewer. This technology is often used in computer and video games because it improves rendering efficiency by reducing a quantity of polygons. Since the object is very far away, theoretically there is no noticeable decrease in the visual quality of the model or the object.

9) Minkowski Sum: For given vector sets A and B, a Minkowski sum of the two sets is defined as $A+B=\{a+b|a\in A,b\in B\}$.

10) Manhattan Polygon_45 with holes: If an included angle between each side of a polygon with holes and a positive x direction is an integer multiple of 45°, the polygon with holes is referred to as a Manhattan Polygon_45 with holes.

11) AABB tree (Axes Aligned Bounding Box Tree): A spatial search tree implemented based on the K-d tree principle. Each node represents a spatial bounding box of a three-dimensional geometric primitive. The data structure can quickly report and query whether a primitive intersects with primitives in the tree, as well as a specific intersection type, an intersection position, and the like.

12) Bounding box: It refers to a smallest circumscribed rectangle that can fully surround a polygon.

13) Axis-aligned bounding box: It refers to a smallest circumscribed rectangle that can fully surround a polygon and have adjacent sides all parallel to coordinate axes.

For time-consuming geometric applications such as the packing problem and a collision detection problem, appropriate approximation needs to be performed on a polygon/polygon with holes to improve the running efficiency of a subsequent algorithm when a data scale is large. In the related art, there is a problem of providing different polygon approximation processing methods for different application requirements. Based on this, the aspects of this application provide a polygon processing method, and a processing result has the following characteristics: 1) An area of a processed target polygon is not less than an original polygon; 2) All sides on an outer boundary of the target polygon and internal holes are horizontally or vertically straight, or an included angle between each of all the sides and a positive x direction is an integer multiple of 45°; and 3) Coordinates of all vertices in the target polygon can be exactly represented by floating point numbers in a computer (optional). Many applications in the industry require that a polygon with holes of an intermediate result is not smaller than an original polygon with holes (such as the collision detection problem, the packing problem, and the like), and when all boundaries meet the Manhattan property and the coordinate points can be exactly represented by floating point numbers, the computing efficiency can be greatly improved. Therefore, compared with the existing polygon processing methods, the polygon processing method provided in the aspects of this application can effectively solve this widespread requirement in the industry.

The aspects of this application provide a polygon processing method and apparatus, a device, and a computer-readable storage medium, which can solve the problem of providing different polygon approximation processing methods for different application requirements. The following describes an illustrative application of a computer device provided in the aspects of this application. The device provided in the aspects of this application may be implemented as various types of user terminals such as a notebook computer, a tablet computer, a desktop computer, a set-top box, or a mobile device (for example, a mobile phone, a portable music player, a personal digital assistant, a dedicated messaging device, or a portable game device), or may be implemented as a server. An illustrative application in which the device is implemented as a server is described below.

Referring to FIG. 1, FIG. 1 is a schematic diagram of an architecture of a game system 100 according to an aspect of this application. As shown in FIG. 1, the game system includes a terminal 200, a network 300, and a server 400. The terminal 200 is connected to the server 400 through the network 300, and the network 300 may be a wide area network or a local area network, or a combination thereof.

Before a game is started, the server 400 first segments a 3D virtual scenario of the game to obtain a two-dimensional scenario polygon graph, and then determines the scenario polygon graph as a to-be-processed original polygon. Then, a first target bounding box of the to-be-processed original polygon is determined, a motion vector is determined based on the first target bounding box, and the original polygon and the first target bounding box are moved based on the motion vector. Then, a second target bounding box of an original polygon obtained after movement is determined, and the second target bounding box is divided into a plurality of squares. A square among the plurality of squares that has an intersection region with the original polygon obtained after movement is determined as a target square, and a target polygon is generated based on connecting sides of the target square, where connecting sides of the target polygon are a part of the connecting sides of the target square. The target polygon is moved to a position corresponding to the original polygon based on the motion vector. Since the connecting sides of the target polygon are a part of the connecting sides of the target square, that is to say, the connecting sides of the target polygon are all horizontally or vertically straight, that is, the target polygon is a Manhattan polygon.

A game battle is started on the terminal 200. During the game battle, game battle data is sent to the server 400. The server 400 may perform collision detection based on the game battle data and an approximated polygon to determine whether an enemy virtual object is hit or colliding with a building, which can improve the processing efficiency of game data.

FIG. 1 only takes a game scene as an example to illustrate an application scenario of the polygon processing method provided in this aspect of this application. This polygon processing method can be applied to any scenario that requires a Manhattan polygon.

In some aspects, the server 400 may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The terminal 200 may be a smartphone, a tablet computer, a notebook computer, a desktop computer, a smart speaker, a smartwatch, a smart television, a smart vehicle terminal, but is not limited thereto. The terminal and the server may be directly or indirectly connected in a wired or wireless communication manner. This is not limited in the aspects of this application.

Figure 2:
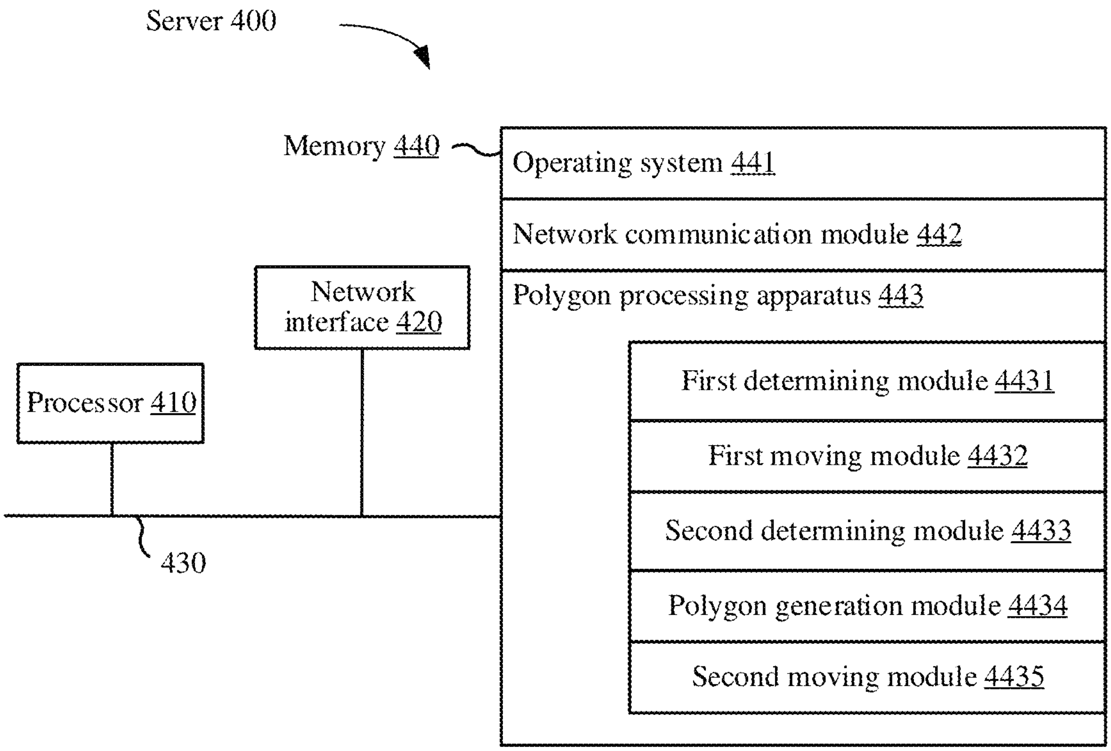
FIG. 2 is a schematic diagram of a structure of a server 400 according to one or more illustrative aspects described herein.

Referring to FIG. 2, FIG. 2 is a schematic diagram of a structure of a server 400 according to an aspect of this application. As shown in FIG. 2, the server 400 includes: at least one processor 410, at least one network interface 420, a bus system 430, and a memory 440. Components in the server 400 are coupled together by using the bus system 430. It may be understood that the bus system 430 is configured to implement connection and communication between the components. In addition to a data bus, the bus system 430 further includes a power bus, a control bus, and a state signal bus. However, for ease of clear description, all types of buses in FIG. 2 are marked as the bus system 430.

The processor 410 may be an integrated circuit chip having a signal processing capability, for example, a general purpose processor, a digital signal processor (DSP), or another programmable logic device (PLD), discrete gate, transistor logical device, or discrete hardware component. The general purpose processor may be a microprocessor, any conventional processor, or the like.

The memory 440 may be a removable memory, a non-removable memory, or a combination thereof. Illustrative hardware devices include a solid-state memory, a hard disk drive, an optical disc driver, or the like. The memory 440 optionally includes one or more storage devices away from the processor 410 in a physical position.

The memory 440 includes a volatile memory or a non-volatile memory, or may include both a volatile memory and a non-volatile memory. The non-volatile memory may be a read-only memory (ROM). The volatile memory may be a random access memory (RAM). The memory 440 described in this aspect of this application is to include any other suitable type of memories.

In some aspects, the memory 440 may store data to support various operations. Examples of the data include a program, a module, and a data structure, or a subset or a superset thereof, which are described below by using examples.

An operating system 441 includes a system program configured to process various basic system services and perform a hardware-related task, such as a framework layer, a core library layer, or a driver layer, and is configured to implement various basic services and process a hardware-based task.

A network communication module 442 is configured to reach another computing device through one or more (wired or wireless) network interfaces 420. Exemplary network interfaces 420 include: a Bluetooth, Wireless Fidelity (WiFi), a universal serial bus (USB), and the like.

In some aspects, the polygon processing apparatus provided in the aspects of this application may be implemented in the form of software. FIG. 2 shows a polygon processing apparatus 443 stored in the memory 440, which may be software in the form of a program and a plug-in, including the following software modules: a first determining module 4431, a first moving module 4432, a second determining module 4433, a polygon generation module 4434, and a second moving module 4435. These modules are logical. Therefore, any combination or further disassembly can be performed according to the functions implemented. The following describes functions of the modules.

In some other aspects, the apparatus provided in this aspect of this application may be implemented by using hardware. For example, the apparatus provided in this aspect of this application may be a processor in a form of a hardware decoding processor, programmed to perform the polygon processing method provided in the aspects of this application. For example, the processor in the form of a hardware decoding processor may use one or more application-specific integrated circuits (ASIC), a DSP, a programmable logic device (PLD), a complex programmable logic device (CPLD), a field-programmable gate array (FPGA), or other electronic components.

The polygon processing method provided in the aspects of this application is described with reference to an illustrative application and implementation of the terminal provided in this aspect of this application.

Figure 3:
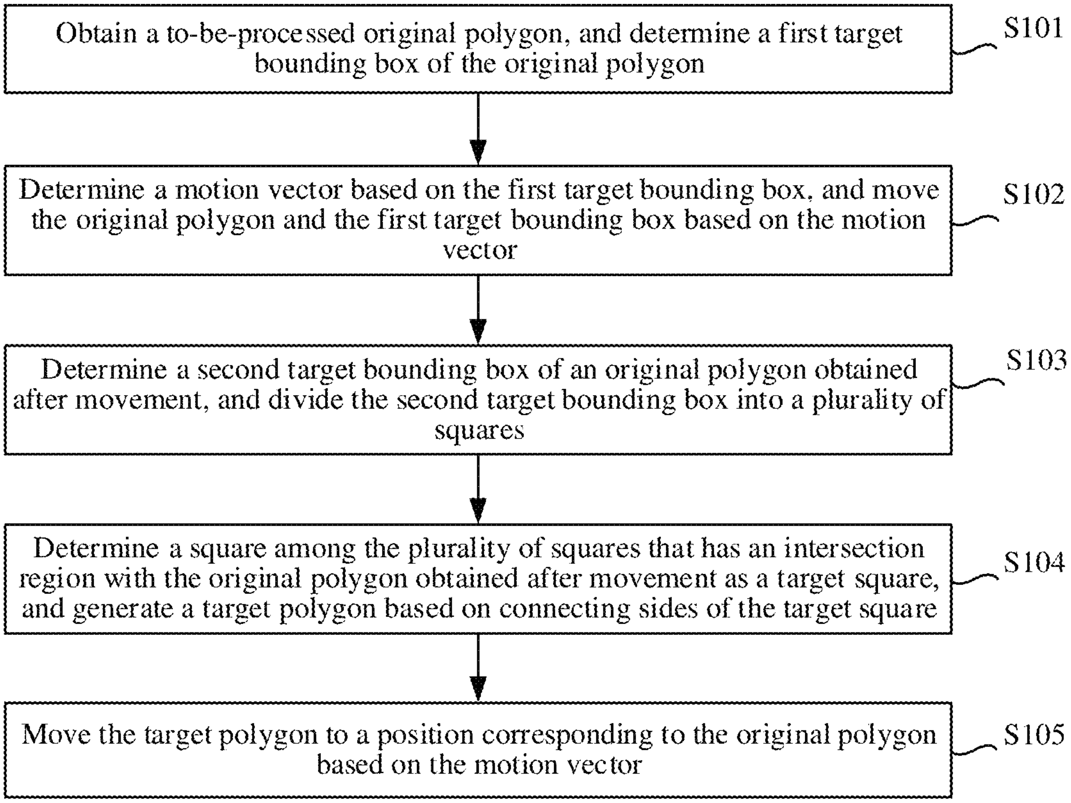
FIG. 3 is a schematic diagram of an implementation process of a polygon processing method according to one or more illustrative aspects described herein.

An aspect of this application provides a polygon processing method, applied to a computer device. The computer device may be a terminal or a server. In this aspect of this application, the computer device is taken as an example. FIG. 3 is a schematic diagram of an implementation process of a polygon processing method according an aspect of this application. A description is made with reference to steps shown in FIG. 3.

Step S101: Obtain a to-be-processed original polygon, and determine a first target bounding box of the original polygon.

A polygon refers to a plane figure formed by three or more line segments connected end to end. The to-be-processed original polygon may be a two-dimensional polygon obtained by dividing a 3D scenario graph, or may be a two-dimensional polygon. The to-be-processed original polygon may be a polygon without holes or a polygon with holes. When a polygon includes one or more polygons, the included polygon is referred to as an island or a hole. The polygon including other polygons may be referred to as an outer polygon. A polygon including an outer polygon and a hole is referred to as a polygon with holes.

In this aspect of this application, the first target bounding box of the original polygon may be determined in different implementations based on different approximation requirements. When a target polygon whose vertex coordinates meet an exact representation condition needs to be generated, vertex coordinates of the first target bounding box also need to meet the exact representation condition. That the vertex coordinates meet the exact representation condition means that a decimal part of the vertex coordinates is an integer multiple of $2^n$, and n is a negative integer. During implementation, an axis-aligned bounding box of the original polygon needs to be modified to obtain the first target bounding box whose vertex coordinates also meet the exact representation condition. When a target polygon whose vertex coordinates meet an exact representation condition does not need to be generated, vertex coordinates of the first target bounding box do not need to meet the exact representation condition, but in this case, the first target bounding box needs to be a square, so that stretching processing needs to be performed on the axis-aligned bounding box of the original polygon to obtain the first target bounding box.

Step S102: Determine a motion vector based on the first target bounding box, and move the original polygon and the first target bounding box based on the motion vector.

During implementation of this step, a motion vector may first be determined based on vertex coordinates of a lower left vertex of the first target bounding box, and then the original polygon and the first target bounding box may be moved based on the motion vector, where a lower left vertex of a first target bounding box obtained after movement coincides with a coordinate origin.

The motion vector is determined based on the vertex coordinates of the lower left vertex of the first target bounding box. During implementation, the vertex coordinates of the lower left vertex may be subtracted from origin coordinates. Since the origin coordinates are (0, 0), it may also be understood as that opposite numbers of the vertex coordinates of the lower left vertex is determined as the motion vector. For example, when the coordinates of the lower left vertex of the first target bounding box are (10, 10), the motion vector is (−10, −10). The original polygon and the first target bounding box are moved based on the motion vector, so that the lower left vertex of the first target bounding box coincides with the coordinate origin.

Moving the original polygon based on the motion vector is to superimpose the motion vector on original vertex coordinates of each vertex of the original polygon to obtain target vertex coordinates of each vertex. Moving the first target bounding box based on the motion vector is to superimpose the motion vector on original vertex coordinates of each vertex of the first target bounding box to obtain target vertex coordinates of each vertex.

For example, if the original vertex coordinates of a vertex of the original polygon are (3, 5) and the motion vector is (−10, −10), the target vertex coordinates of the vertex are (−7, −5).

Step S103: Determine a second target bounding box of an original polygon obtained after movement, and divide the second target bounding box into a plurality of squares.

Similar to the first target bounding box, the second target bounding box of the original polygon obtained after movement is determined in different implementations based on different approximation requirements. When a target polygon whose vertex coordinates meet an exact representation condition needs to be generated, vertex coordinates of the second target bounding box need to meet the exact representation condition, and vertex coordinates of the plurality of squares obtained by dividing the second target bounding box also need to meet the exact representation condition, so that it is necessary to ensure that a length and a width of the second target bounding box are both an integer multiple of a square side length. When the second bounding box is divided into the plurality of squares, the second target bounding box may be divided according to a preset square side length, where the preset square side length also needs to meet the exact representation condition, that is, a decimal part of the square side length is an integer multiple of $2^n$, and n is a negative integer.

When a target polygon whose vertex coordinates meet an exact representation condition does not need to be generated, vertex coordinates of the divided squares do not need to be exactly represented. Therefore, in this step, the first target bounding box obtained after movement is determined as the second target bounding box of the original polygon obtained after movement. When the second bounding box is divided into the plurality of squares, a square side length may be determined based on a preset resolution, and then the second target bounding box is divided based on the determined square side length.

Step S104: Determine a square among the plurality of squares that has an intersection region with the original polygon obtained after movement as a target square, and generate a target polygon based on connecting sides of the target square.

During implementation of this step, a center point of each square is first determined, then a square whose center point is located inside the polygon is determined as a target square, and a square whose center point is not located inside the polygon but has an intersection with the connecting side of the polygon is also determined as a target square. After target squares are determined, a target connecting side that is not shared by two squares is determined from the plurality of target squares, and finally a target polygon is generated based on the target connecting side. That is to say, connecting sides of the target polygon are a part of connecting sides of the target square. In this aspect of this application, a lower left vertex of the second target bounding box is the coordinate origin, and the second target bounding box is an axis-aligned bounding box. Therefore, two adjacent connecting sides of the second target bounding box coincide with an x axis and a y axis respectively, then the connecting sides of the plurality of squares obtained by dividing the second target bounding box are also parallel to the x axis or the y axis. Since the connecting sides of the target polygon are the connecting sides of the target square, that is to say, the connecting sides of the target polygon are parallel to the x axis or the y axis, that is, the connecting sides are all horizontally or vertically straight.

Step S105: Move the target polygon to a position corresponding to the original polygon based on the motion vector.

During implementation of this step, a recovery vector that moves the target polygon to a position corresponding to the original polygon may be determined based on the motion vector, and then the target polygon is moved to the position corresponding to the original polygon based on the recovery vector. The recovery vector is a vector with the same magnitude and an opposite direction as the motion vector. Following the foregoing example, the motion vector is (−10, −10), and then the recovery vector in this case is (10, 10). Based on the recovery vector, the target polygon is moved to the position corresponding to the original polygon. During implementation, the recovery vector is superimposed on current vertex coordinates of each vertex of the target polygon to obtain target vertex coordinates of each vertex, and the target polygon moved to the position corresponding to the original polygon is obtained is obtained by connecting vertices corresponding to the target vertex coordinates.

In the polygon processing method provided in the aspects of this application, after a to-be-processed original polygon is obtained, a first target bounding box of the original polygon is first determined, then a motion vector is determined based on the first target bounding box, and the original polygon and the first target bounding box are moved based on the motion vector. A lower left vertex of a first target bounding box obtained after movement coincides with a coordinate origin, then a second target bounding box of an original polygon obtained after movement is determined, and the second target bounding box is divided into a plurality of squares. A square among the plurality of squares that has an intersection region with the original polygon obtained after movement is determined as a target square, and a target polygon is generated based on connecting sides of the target square, where connecting sides of the target polygon are a part of the connecting sides of the target square. The target polygon is moved to a position corresponding to the original polygon based on the motion vector. Since a lower left vertex of the second target bounding box is the coordinate origin, and two connecting sides of the second target bounding box coincide with an x axis and a y axis respectively, connecting sides of the plurality of squares obtained by dividing the second target bounding box are also parallel to the x axis or the y axis. Further, the connecting sides of the target polygon are the connecting sides of the target square. That is to say, the connecting sides of the target polygon are parallel to the x axis or the y axis, that is, the connecting sides are all horizontally or vertically straight, which improves the execution efficiency and robustness of executing a geometric algorithm by using the target polygon.

In some aspects, "determine a first target bounding box of the original polygon" in the foregoing step S101 has different implementations based on different approximation requirements. When a target polygon whose vertex coordinates meet an exact representation condition needs to be generated, vertex coordinates of the first target bounding box also need to meet the exact representation condition. In this case, this step may be implemented through the following step S1011A to step S1013A, and the steps are described below.

Step S1011A: Determine an axis-aligned bounding box of the original polygon.

During implementation of this step, vertex coordinates of each vertex on the original polygon may be first obtained, then a minimum x coordinate, a maximum x coordinate, a minimum y coordinate, and a maximum y coordinate are determined from the vertex coordinates of each vertex, then (the minimum x coordinate, the minimum y coordinate) and (the maximum x coordinate, the maximum y coordinate) are determined as coordinates of two diagonal vertices of the axis-aligned bounding box, and then the axis-aligned bounding box is determined.

Step S1012A: Obtain a preset coordinate numerical accuracy and modify, based on the coordinate numerical accuracy, vertex coordinates of diagonal vertices of the axis-aligned bounding box to obtain modified vertex coordinates.

The modified vertex coordinates meet the exact representation condition. In the aspects of this application, the coordinates represented exactly means that the coordinate values can be exactly represented using commonly used floating point numbers. Since in a computer, binary numbers are used to represent numerical values, an integer part may be exactly represented by binary, while a decimal part can hardly be exactly represented by binary, but generally speaking, a decimal part with a form of $2^n(n \in \mathbb{Z}_-)$ may be exactly represented by floating point numbers. Therefore, in this aspect of this application, that the vertex coordinates meet the exact representation condition means that a decimal part of the vertex coordinates is an integer multiple of $2^n(n \in \mathbb{Z}_-)$.

In this aspect of this application, the preset coordinate numerical accuracy is $2^n$, and n is a negative integer. During implementation of this step, vertex coordinates of a lower left vertex and an upper right vertex of the axis-aligned bounding box may be modified. Assuming that the minimum x coordinate is $x_{min}$, and a modified minimum x coordinate is $x_{min}$(new), then $x_{min}(new)=\lfloor x_{min} \rfloor+a*2^n$, and $\lfloor x_{min} \rfloor+a*2^n \le x_{min} < \lfloor x_{min} \rfloor+(a+1)*2^n$ is met, where $\lfloor x_{min} \rfloor$ is to round down $x_{min}$. Assuming that the minimum y coordinate is $y_{min}$, and a modified minimum y coordinate is $y_{min}$(new), then $y_{min}(new)=\lfloor y_{min} \rfloor*2^n$, and $\lfloor y_{min} \rfloor+b*2^n \le y_{min} < \lfloor y_{min} \rfloor+(b+1)*2^n$ is met, where $\lfloor y_{min} \rfloor$ is to round down $y_{min}$. Assuming that the maximum x coordinate is $x_{max}$, and a modified maximum x coordinate is $x_{max}$(new), then $x_{max}(new)=\lceil x_{max} \rceil-c*2^n$, and $\lceil x_{max} \rceil-c*2^n \ge x_{max} > \lceil x_{max} \rceil-(c+1)*2^n$ is met, where $\lceil x_{max} \rceil$ is to round up $x_{max}$. Assuming that the maximum y coordinate is $y_{max}$, and a modified maximum y coordinate is $y_{max}$(new), then $y_{max}(new)=\lceil y_{max} \rceil-d*2^n$, and $\lceil y_{max} \rceil-d*2^n \ge y_{max} > \lceil y_{max} \rceil-(d+1)*2^n$ is met. a, b, c, and d are all positive integers.

Step S1013A: Determine the first target bounding box of the original polygon based on the modified vertex coordinates.

The modified vertex coordinates are determined as the vertex coordinates of the first target bounding box. Therefore, after the two diagonal vertex coordinates are determined, the first target bounding box can be determined.

Taking the lower left vertex of the first target bounding box as an example, the coordinates of the lower left vertex are $(\lfloor x_{min} \rfloor+a*2^n, \lfloor y_{min} \rfloor+b*2^n)$. Since the decimal part of the lower left vertex is an integer multiple of $2^n$, the vertex coordinates of the lower left vertex of the first target bounding box meet the exact presentation condition. Similarly, the vertex coordinates of the upper right vertex of the first target bounding box also meet the exact representation condition, and the motion vector determined by using the first target bounding box also meets the exact representation condition, thereby ensuring that after a Manhattan polygon with holes whose coordinates can be represented exactly is generated, a Manhattan polygon with holes that is obtained after performing movement according to the motion vector meeting the exact representation condition and that is obtained after translation transformation also meets the requirement that the coordinates can be exactly represented.

Similar to the foregoing "determine a first target bounding box of the original polygon", step S103 "determine a second target bounding box of an original polygon obtained after movement, and divide the second target bounding box into a plurality of squares" also has different implementations based on different approximation requirements. When a target polygon whose vertex coordinates meet an exact representation condition needs to be generated, vertex coordinates of the plurality of squares obtained by dividing the second target bounding box also need to meet the exact representation condition. In this case, this step may be implemented through the following step S1031A to step S1036A, and the steps are described below.

Step S1031A: Determine a first length and a first width of the first target bounding box.

Assuming that the vertex coordinates of the lower left vertex of the first target bounding box are ($x_{min}$(new), $y_{min}$(new)) and the vertex coordinates of the upper right vertex are ($x_{max}$(new), $y_{max}$(new)), the first length is a greater value of $x_{max}(new)-x_{min}(new)$ and $y_{max}(new)-y_{min}(new)$, and the first width is a smaller value of $x_{max}(new)-x_{min}(new)$ and $y_{max}(new)-y_{min}(new)$.

Step S1032A: Obtain a preset square side length.

A decimal part of the square side length can exactly divide the coordinate numerical accuracy. For example, the square side length may be $e+f*2^n$, and e and f are both positive integers.

Step S1033A: Determine a second length of the second target bounding box based on the first length and the square side length.

During implementation of this step, the first length is first divided by the square side length to obtain a first quotient value, the obtained first quotient value is rounded up to obtain a first integer value, and then the first integer value is multiplied by the square side length to obtain the second length. Since the first quotient value is rounded up, the second length is greater than or equal to the first length, and the second length can exactly divide the square side length.

Step S1034A: Determine a second width of the second target bounding box based on the first width and the square side length.

During implementation of this step, the first width is first divided by the square side length to obtain a second quotient value, the obtained second quotient value is rounded up to obtain a second integer value, and then the second integer value is multiplied by the square side length to obtain the second width. Since the second quotient value is rounded up, the second width is also greater than or equal to the first width, and the second width can exactly divide the square side length.

Step S1035A: Determine the coordinate origin as a lower left vertex of the second target bounding box, and determine the second target bounding box based on the coordinate origin, the second length, and the second width.

Since the coordinate origin is determined as the lower left vertex of the second target bounding box, after coordinates of one vertex of the rectangle is known as well as the length and width, coordinates of the other three vertices of the rectangle may be determined, that is, the second target bounding box is determined.

Step S1036A: Divide the second target bounding box into a plurality of squares according to the square side length.

Since the lower left vertex of the second target bounding box is the coordinate origin, for the plurality of squares obtained by dividing the second target bounding box according to the square side length, the vertex coordinates of each square are integer multiples of the square side length. Since the square side length meets the exact representation condition, so that the vertex coordinates of each square also meet the exact representation condition, which ensures that the vertex coordinates of the target polygon determined based on the square can be exactly represented. Therefore, the use of a floating point computing kernel can ensure the correctness and robustness of many geometric algorithms, and experiments have shown that the execution efficiency of the geometric algorithms such as polygonal Boolean operation, Minkowski sum, and Voronoi diagram based on the floating point computing kernel may be optimized by hundreds of times.

Figure 4:
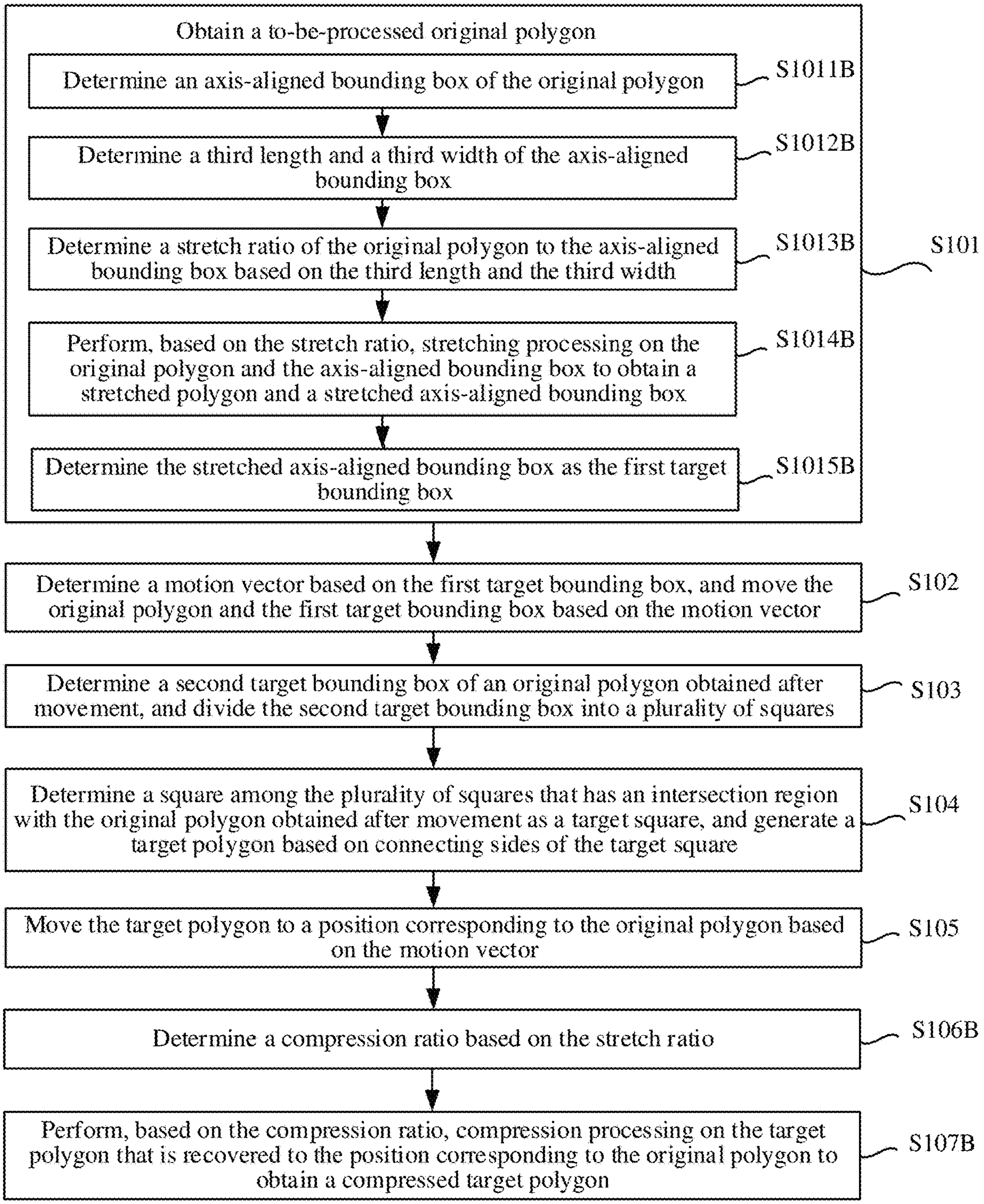
FIG. 4 is a schematic diagram of another implementation process of a polygon processing method according to one or more illustrative aspects described herein.

In some aspects, when a target polygon whose vertex coordinates meet an exact representation condition does not need to be generated, the vertex coordinates of the first target bounding box do not need to meet the exact representation condition. In this case, the foregoing step S101 "determine a first target bounding box of the original polygon" may be implemented through step S1011B to step S1015B in FIG. 4, and the steps are described below with reference to FIG. 4.

Step S1011B: Determine an axis-aligned bounding box of the original polygon.

An implementation process of this step is the same as an implementation process of step S1011A, and reference may be made to the implementation process of step S1011A during implementation.

Step S1012B: Determine a third length and a third width of the axis-aligned bounding box.

Following the foregoing example, coordinates of a lower left vertex of the axis-aligned bounding box are $(x_{min}, y_{min})$ and coordinates of an upper right vertex are $(x_{max}, y_{max})$, so that the third length is a greater value of $x_{max}(new)-x_{min}(new)$ and $y_{max}(new)-y_{min}(new)$, and the third width is a smaller value of $x_{max}(new)-x_{min}(new)$ and $y_{max}(new)-y_{min}(new)$.

Step S1013B: Determine a stretch ratio of the original polygon to the axis-aligned bounding box based on the third length and the third width.

During implementation, a ratio of the third length to the third width is determined as the stretch ratio of the axis-aligned bounding box, and the stretch ratio is a real number greater than 1.

Step S1014B: Perform, based on the stretch ratio, stretching processing on the original polygon and the axis-aligned bounding box to obtain a stretched polygon and a stretched axis-aligned bounding box.

During implementation of this step, stretching processing may be performed, based on the stretch ratio, on the original polygon and the axis-aligned bounding box in a width direction of the axis-aligned bounding box from a center point of the original polygon (that is, a center point of the axis-aligned bounding box). Since the stretch ratio is a quotient value obtained by dividing the third length by the third width, the stretched axis-aligned bounding box is a square.

Step S1015B: Determine the stretched axis-aligned bounding box as the first target bounding box.

In the aspect from step S1011B to step S1015B, when a target polygon with coordinates represented exactly does not need to be generated, the axis-aligned bounding box of the original polygon is stretched into a square to obtain the first target bounding box, thereby ensuring that the target bounding box can be divided into equal amounts of squares in an x-axis direction and in a y-axis direction.

In some aspects, in the foregoing step S103 "determine a second target bounding box of an original polygon obtained after movement, and divide the second target bounding box into a plurality of squares", when a target polygon whose vertex coordinates meet an exact representation condition does not need to be generated, this step may be implemented through the following step S1031B to step S1033B, and the steps are described below.

Step S1031B: Obtain a first target bounding box obtained after movement, and determine the first target bounding box obtained after movement as the second target bounding box of the original polygon obtained after movement.

That is to say, a lower left vertex of the second target bounding box is the coordinate origin.

Step S1032B: Obtain a preset quantity of squares, and determine a square side length based on the quantity of squares and a side length of the second target bounding box.

In this aspect of this application, the preset quantity of squares may refer to a quantity of squares in a single row. During implementation of this step, a side length of the second target bounding box is divided by the quantity of squares to obtain the square side length.

In some aspects, the preset quantity of squares may refer to a total quantity of squares included in the second target bounding box. During implementation of this step, the preset quantity of squares is first extracted to obtain a quantity of squares in a single row, and then a side length of the second target bounding box is divided by the quantity of squares in a single row to obtain the square side length.

Step S1033B: Divide the second target bounding box into a plurality of squares based on the square side length.

It may be concluded from the foregoing step S1011B to step S1015B that when a target polygon whose vertex coordinates meet an exact representation condition needs to be generated, when the first target bounding box is determined, stretching processing is performed on the axis-aligned bounding box of the original polygon. Correspondingly, after step S105 "move the target polygon to a position corresponding to the original polygon based on the motion vector", step S106B and step S107B shown in FIG. 4 need to be further performed, and the steps are described below with reference to FIG. 4.

Step S106B: Determine a compression ratio based on the stretch ratio.

During implementation of this step, a reciprocal of the stretch ratio is determined as the compression ratio. Since the stretch ratio is a real number greater than 1, the compression ratio is a real number less than 1.

Step S107B: Perform, based on the compression ratio, compression processing on the target polygon that is moved to the position corresponding to the original polygon to obtain a compressed target polygon.

A center point of the target polygon is used as a reference point, and compression processing is performed on the target polygon in a width direction of the axis-aligned bounding box of the original polygon to obtain the compressed target polygon. Because when a target polygon with coordinates represented exactly does not need to be generated, the first target bounding box obtained after movement is determined as the second target bounding box, and when a target polygon with coordinates represented exactly needs to be generated, the second target bounding box is generally larger than the first target bounding box, compared to the case that a target polygon with coordinates represented exactly needs to be generated, when a target polygon with coordinates represented exactly does not need to be generated, enveloping of the target polygon to the original polygon with holes is tighter, and shapes are closer to each other.

In some aspects, the foregoing step S104 "determine a square among the plurality of squares that has an intersection region with the original polygon obtained after movement as a target square, and generate a target polygon based on connecting sides of the target square" may be implemented through step S1041 to step S1049, and the steps are described below.

Step S1041: Determine a center point of each square, and determine a square whose center point is located inside the original polygon obtained after movement as the target square.

In this aspect of this application, to determine whether the center point is located inside the original polygon obtained after movement, during implementation, a ray with the center point as a vertex may be generated, and then a quantity of intersections between the ray and the original polygon obtained after movement is determined. If the quantity of intersections is an even number, it means that the center point is located outside the original polygon obtained after movement; and if the quantity of intersections is an odd number, it means that the center point is located inside the original polygon obtained after movement.

The target square in this aspect of this application corresponds to an effective grid in other aspects.

Step S1042: Determine a square whose center point is not located inside the original polygon obtained after movement and whose square boundary intersects with the polygon as the target square.

If it is determined that the center point is not located inside the original polygon obtained after movement, whether the square corresponding to the center point intersects with the connecting side of the original polygon obtained after movement needs to be further determined. During implementation, an AABB tree may be constructed using connecting sides of the original polygon obtained after movement as an input, and then for each center point that is not located inside the original polygon obtained after movement, whether four sides of the square corresponding to the center point have intersections with the AABB tree is determined. If at least one intersection exists between the four sides of the square and the AABB tree, the square is determined as a target square.

Step S1043: Determine an effective connecting side from the connecting sides of the target square.

The effective connecting side is not shared by two target squares. In some aspects, each connecting side of the target square is obtained and whether the connecting side is also located in other target squares is determined. If the connecting side is also located in other target squares, the connecting side is not an effective connecting side; and if the connecting side is not located in any other target square, the connecting side is an effective connecting side.

Step S1044: Establish, based on a plurality of effective connecting sides, a mapping set between endpoints of the effective connecting sides and the effective connecting sides.

The mapping set includes a mapping relationship between the endpoints of the plurality of effective connecting sides and the effective connecting sides.

Step S1045: Determine, based on the mapping set, target endpoints capable of forming a ring shape, and generate a simple polygon based on the target endpoints capable of forming the ring shape.

During implementation of this step, a $k^{th}$ endpoint is obtained from the mapping set, the $k^{th}$ endpoint is determined as a current processed endpoint, and the current processed endpoint is pushed into a pre-created endpoint stack, where k=1, 2, . . . , K, and K is a total quantity of endpoints. When there is an effective connecting side corresponding to the current processed endpoint in the mapping set, the effective connecting side is deleted from the mapping set, and the other endpoint of the effective connecting side is pushed into the endpoint stack. When there is an endpoint that is the same as a top endpoint of the stack in the endpoint stack, each endpoint above the endpoint is popped out of the stack, and the endpoints are determined as target endpoints that can form a ring shape. A next endpoint of the current processed endpoint is updated to a current processed endpoint, and the current processed endpoint is pushed into the endpoint stack. After each endpoint in the mapping set is pushed into the stack, the endpoint stack is not empty. If current endpoints in the endpoint stack can form a ring shape, the current endpoints are determined as the target endpoints.

Step S1046: In a case that a quantity of generated simple polygons is at least two, determine an inclusion relationship between the at least two simple polygons.

In this step, the inclusion relationship between every two simple polygons needs to be determined. Since the at least two simple polygons do not intersect with each other and have at most a common vertex, during implementation of this step, a simple polygon is first obtained from the at least two simple polygons, and then an inclusion relationship between this simple polygon and other simple polygons is determined sequentially. Then a simple polygon is selected from other polygons other than the simple polygon, and then an inclusion relationship between the selected simple polygon and the remaining simple polygons is determined sequentially. Analogy is made in this way, until the inclusion relationship between every two simple polygons in the at least two simple polygons is determined.

Description is made herein by using an example of determining an inclusion relationship between a $p^{th}$ simple polygon and a $q^{th}$ simple polygon. During implementation, a vertex of the $p^{th}$ simple polygon may be obtained and whether the vertex is located inside or outside the $q^{th}$ simple polygon is determined. If the vertex is located inside the $q^{th}$ simple polygon, it means that the $q^{th}$ simple polygon includes the $p^{th}$ simple polygon, and determination ends in this case. If the vertex is located outside the $q^{th}$ simple polygon, it means that the $q^{th}$ simple polygon does not include the $p^{th}$ simple polygon, and determination may also end in this case. If the vertex is neither located inside the $q^{th}$ simple polygon nor located outside the $p^{th}$ simple polygon, it means that the vertex is a common vertex of the $p^{th}$ simple polygon and the $q^{th}$ simple polygon. In this case, the remaining vertices of the $p^{th}$ simple polygon need to be obtained again and are continuously determined until it is determined whether the $q^{th}$ simple polygon includes the $p^{th}$ simple polygon, where the $p^{th}$ simple polygon and the $q^{th}$ simple polygon are any two polygons of the at least two generated simple polygons.

Step S1047: Determine, based on the inclusion relationship between the at least two simple polygons, at least one first simple polygon as a new outer boundary of the target polygon from the at least two simple polygons.

During implementation of this step, when an original outer boundary of a to-be-modified polygon meets a non-simple polygon condition and an original hole meets a simple polygon condition, a simple polygon in the at least two simple polygons that is not included by any other simple polygon except the simple polygon itself is determined as the first simple polygon serving as the new outer boundary. When the original outer boundary and the internal hole of the to-be-modified polygon do not meet the simple polygon condition, during implementation of this step, a number of times that each simple polygon is included is determined, and a simple polygon whose quantity of times that the simple polygon is included is an even number is determined as the first simple polygon serving as the new outer boundary of the target polygon.

Step S1048: Determine an internal hole corresponding to each first simple polygon based on a second simple polygon.

The second simple polygon is a polygon other than the first simple polygon in the at least two simple polygons.

Corresponding to step S1047, when the original outer boundary of the to-be-modified polygon meets a relatively simple polygon condition and the original hole meets the simple polygon condition, during implementation of this step, based on the implementation of determining an inclusion relationship between every two polygons in step S103, the original hole and the second simple polygon that are included by each first sample polygon are determined, thereby determining the internal hole corresponding to each first simple polygon. When both the original outer boundary and the original hole of the to-be-modified polygon do not meet the simple polygon condition, during implementation of this step, the second simple polygon included in each first simple polygon is first determined, these second simple polygons are determined as candidate holes, and then a candidate hole that is not included by other candidate holes except the candidate hole is determined as the internal hole corresponding to each first simple polygon.

Step S1049: Generate the target polygon based on each first simple polygon and the internal hole corresponding to each first simple polygon.

After the internal hole actually corresponding to each first simple polygon is determined, the target polygon may be determined based on each first simple polygon and the internal hole actually corresponding to each first simple polygon.

Through the foregoing step S1041 to step S1049, a mapping set between the endpoints of the effective connecting sides and the effective connecting sides may be established based on the effective connecting sides of the target square, and a connection relationship between the effective connecting sides is established through this mapping set. Therefore, the target endpoints that can form a ring shape can be determined based on the mapping set, and a simple polygon is generated based on the target endpoints that can form a ring shape. If there are at least two generated simple polygons, an inclusion relationship between the at least two simple polygons needs to be determined, and at least one first simple polygon serving as a new outer boundary is determined from the at least two simple polygons based on the inclusion relationship between the at least two simple polygons. Then the real internal hole corresponding to each first simple polygon is determined based on the second simple polygon, and finally each simple polygon is generated based on each first simple polygon and the internal hole corresponding to each first simple polygon. In this way, a polygon formed by unordered line segments can be generated into a simple polygon, thereby ensuring that a geometric algorithm can be executed correctly when the simple polygon is used for execution.

In some aspects, the foregoing step S1043 "determine an effective connecting side from the connecting sides of the target square" may be implemented through step S431 to step S435, and the steps are described below.

Step S431: Obtain four connecting sides of each target square.

Step S432: Sequentially determine whether each connecting side exists in a preset effective connecting side set.

When the connecting side exists in the effective connecting side set, it means that the connecting side is also a connecting side of another target square, that is, the connecting side is a common side of two target squares. In this case, step S433 is performed. When the connecting side does not exist in the effective connecting side set, it means that the connecting side is not a common side. In this case, step S434 is performed.

Step S433: Delete the connecting side from the effective connecting side set.

If the connecting side is a common side of two target squares, it means that the connecting side is an internal side of two adjacent effective connecting sides, so that the connecting side is deleted from the effective connecting side set.

Step S434: Add the connecting side to the effective connecting side set.

If the connecting side does not exist in the effective connecting side set, it means that the connecting side is not a common side of two target squares in this case, and then the connecting side is added to the effective connecting side set.

Step S435: Determine each connecting side in the effective connecting side set as the effective connecting side.

Through the foregoing step S431 to step S435, a connecting side in the target square that is shared by two target squares is deleted, and a connecting side that is not shared by two target squares is determined as an effective connecting side, which can ensure that connecting sides of an approximated polygon are all horizontally or vertically straight, thereby improving the processing speed of a polygon geometry processing algorithm.

Figure 5:
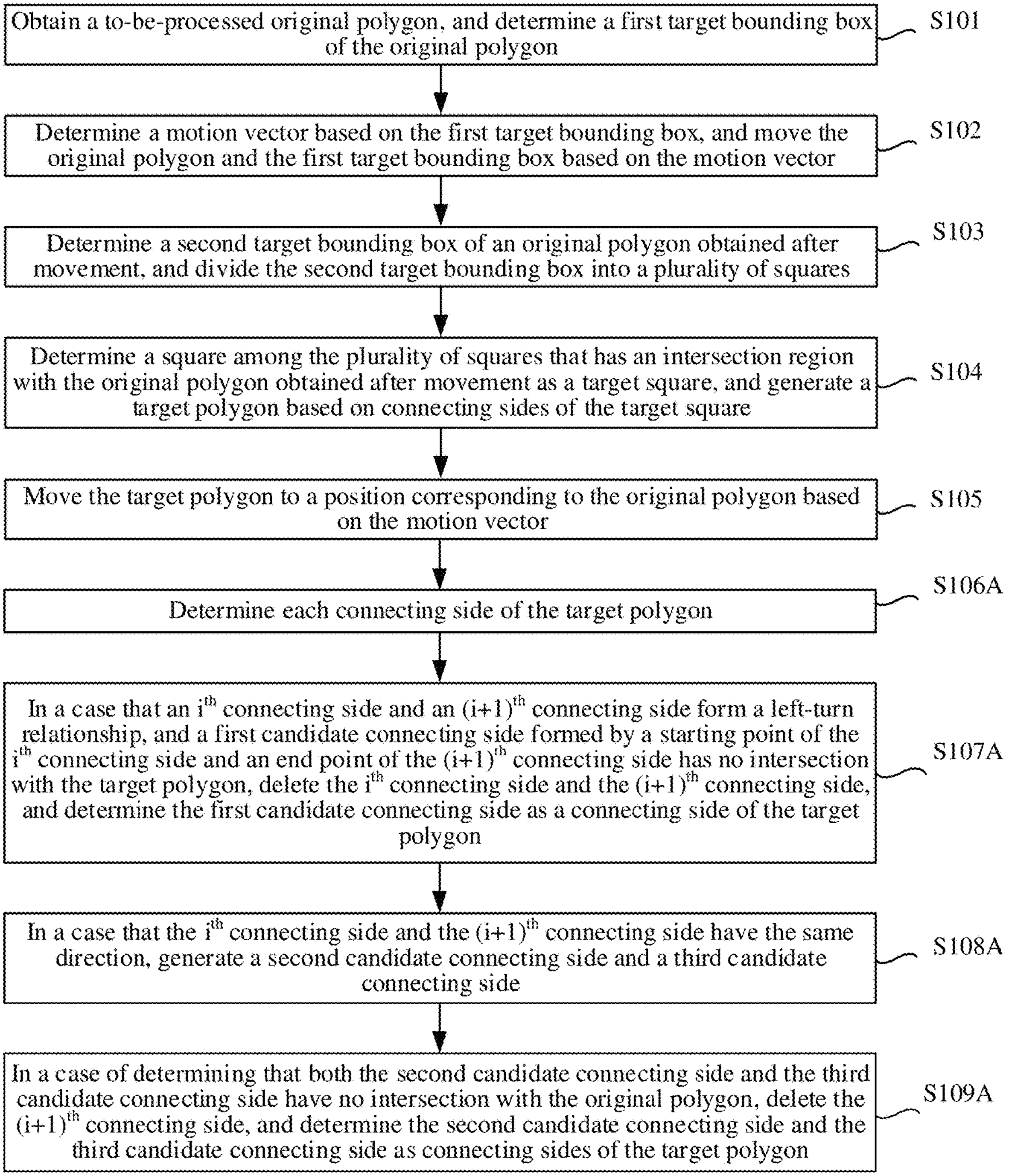
FIG. 5 is a schematic diagram of still another implementation process of a polygon processing method according to one or more illustrative aspects described herein.

In an actual application process, when it is determined that a target polygon whose vertex coordinates meet an exact representation condition needs to be generated, the foregoing step S101 to step S105 may be used to generate a target polygon whose connecting sides are all horizontally or vertically straight. To make the approximated polygon closer to the original polygon, after step S105, a 45-degree Manhattan polygon with coordinates represented exactly may be generated through step S106A to step S109A shown in FIG. 5, and the steps are described below with reference to FIG. 5.

Step S106A: Determine each connecting side of the target polygon.

Each connecting side of the target polygon refers to the effective connecting side in the target square, and the effective connecting side is not shared by two target squares.

Step S107A: In a case that an $i^{th}$ connecting side and an $(i+1)^{th}$ connecting side form a left-turn relationship, and a first candidate connecting side formed by a starting point of the $i^{th}$ connecting side and an end point of the (i+1)th connecting side has no intersection with the original polygon, delete the $i^{th}$ connecting side and the (i+1)th connecting side, and determine the first candidate connecting side as a connecting side of the target polygon.

i=1, 2, . . . , N, N is a total quantity of connecting sides of the target polygon, and N is an integer greater than 2. In addition, the $i^{th}$ connecting side and the $(i+1)^{th}$ connecting side are two adjacent connecting sides in the target polygon, that is, the $i^{th}$ connecting side and the $(i+1)^{th}$ connecting side have a common endpoint. Generally, an end point of the $i^{th}$ connecting side is a starting point of the $(i+1)^{th}$ connecting side. During implementation, an $i^{th}$ vector corresponding to the $i^{th}$ connecting side may further be determined based on starting point coordinates and end point coordinates of the $i^{th}$ connecting side, an (i+1)th vector corresponding to the $(i+1)^{th}$ connecting side is determined based on starting point coordinates and end point coordinates of the (i+1)th connecting side, and then a rotation angle and a rotation direction between the $i^{th}$ vector and the $(i+1)^{th}$ vector are determined. If the rotation angle is 900 and the rotation direction is counterclockwise, it means that the $i^{th}$ connecting side and the $(i+1)^{h}$ connecting side form a 90° left-turn relationship. Then, an AABB tree is created based on the connecting sides of the original polygon, a starting point of the $i^{th}$ connecting side and an end point of the (i+1)th connecting side are connected to form a first candidate connecting side, and then whether the first candidate connecting side has an intersection with the connecting sides of the original polygon is determined based on the AABB tree. If the first candidate connecting side has no intersection with any connecting side of the original polygon, then the $i^{th}$ connecting side and the (i+1)th connecting side are deleted, and the first candidate connecting side is determined as a connecting side of the target polygon.

Step S108A: In a case that the $i^{th}$ connecting side and the (i+1)th connecting side have the same direction, generate a second candidate connecting side and a third candidate connecting side.

In some aspects, when an included angle between the $i^{th}$ vector corresponding to the $i^{th}$ connecting side and the (i+1)th vector corresponding to the (i+1)th connecting side is 0°, it is determined that the $i^{th}$ connecting side and the (i+1)th connecting side have the same direction. In this case, the second candidate connecting side and the third candidate connecting side are generated. A starting point of the second candidate connecting side is an end point of the $i^{th}$ connecting side, the second candidate connecting side forms a 450 left-turn relationship with the $i^{th}$ connecting side, a starting point of the third candidate connecting side is an end point of the second candidate connecting side, an end point of the third candidate connecting side is the end point of the $(i+1)^{th}$ connecting side, and the third candidate connection side is the same length as the $i^{th}$ connecting side.

Step S109A: In a case of determining that both the second candidate connecting side and the third candidate connecting side have no intersection with the original polygon, delete the $(i+1)^{th}$ connecting side, and determine the second candidate connecting side and the third candidate connecting side as connecting sides of the target polygon.

During implementation of this step, whether the second candidate connecting side and the third candidate connecting side have an intersection with any connecting side of the original polygon is determined based on the AABB tree. In a case that both the second candidate connecting side and the third candidate connecting side have no intersection with any connecting side of the original polygon, the $(i+1)^{th}$ connecting side is deleted, and the second candidate connecting side and the third candidate connecting side are determined as connecting sides of the target polygon.

Through the foregoing step S106A to step S109A, the target polygon with coordinates represented exactly may be converted into a Manhattan Polygon_45 with holes. The Manhattan Polygon_45 with holes envelops the original polygon in a tighter manner and has a closer shape to that of the original polygon on the premise of ensuring that the coordinates can be exactly represented.

The following describes an illustrative application of this aspect of this application in an actual application scenario.

Based on the foregoing aspects, the aspects of this application further provide a polygon processing method. For any polygon with holes, through the polygon processing method, a polygon with holes having the following characteristics may be generated: 1) A result is not smaller than an original polygon with holes; 2) All sides on an outer boundary of the result and internal holes are horizontally or vertically straight, or an included angle between each of all the sides and a positive x direction is an integer multiple of 45°; and 3) Coordinates of all vertices in the result can be exactly represented by floating point numbers in a computer (optional). Many applications in the industry require that a polygon with holes of an intermediate result is not smaller than an original polygon with holes (such as the collision detection problem, the packing problem, and the like), and when all boundaries meet the Manhattan properties and the coordinate points can be exactly represented by floating point numbers, the computing efficiency can be greatly improved. Therefore, compared with the existing polygon processing methods, the polygon processing method provided in the aspects of this application can effectively solve this common requirement in the industry.

The following describes the implementation process of the polygon processing method provided in the aspects of this application.

First, this aspect of this application provides a polygon processing method. The polygon processing method can be used to approximate any given polygon with holes into a Manhattan polygon with holes with coordinates represented exactly. The polygon processing method can be implemented through the following step S401 to step S405, and each step is described below.

Step S401: Move an original polygon with holes.

To enable coordinates of an original polygon with holes at any position to be exactly represented after being processed by the polygon processing method provided in the aspects of this application, translation transformation is first performed on the original polygon. Assuming that the original polygon with holes is shown as 601 in FIG. 6, an axis-aligned bounding box is ($x_{min}$, $y_{min}$, $x_{max}$, $y_{max}$), and a coordinate value resolution set by a user is $2^n$($n \in \mathbf{Z}^-$) (for example, when n=−2, the resolution is 0.25, and then decimal parts of all coordinate point values are all integer multiples of 0.25), then the bounding box with coordinates represented exactly is defined as:

$$\begin{cases} x_{min}(\text{new}) = \lfloor x_{min} \rfloor + a*2^n, & \lfloor x_{min} \rfloor + a*2^n \le x_{min} < \lfloor x_{min} \rfloor + (a+1)*2^n \\ y_{min}(\text{new}) = \lfloor y_{min} \rfloor + b*2^n, & \lfloor y_{min} \rfloor + b*2^n \le y_{min} < \lfloor y_{min} \rfloor + (b+1)*2^n \\ x_{max}(\text{new}) = \lceil x_{max} \rceil - c*2^n, & \lceil x_{max} \rceil - c*2^n \ge x_{max} > \lceil x_{max} \rceil - (c+1)*2^n \\ y_{max}(\text{new}) = \lceil y_{max} \rceil - d*2^n, & \lceil y_{max} \rceil - d*2^n \ge y_{max} > \lceil y_{max} \rceil - (d+1)*2^n \end{cases},$$

where a, b, c, d∈□. During implementation of this step, the original polygon with holes is moved by a vector $V_1=(x_{min}(\text{new}), y_{min}(\text{new}))$, so that a lower left corner of a new bounding box with coordinates represented exactly coincides with the coordinate origin (note that the bounding box may not coincide with the coordinate origin in this case). The reason for this is: in the original bounding box, the coordinates of $x_{min}$, $y_{min}$ may not be exactly represented, so if $V=(x_{min}, y_{min})$ is directly moved, then $V=(-x_{min}, -y_{min})$ is moved after a Manhattan polygon with holes is generated, which may cause a Manhattan polygon with holes obtained after translation transformation to no longer meet the requirement that the coordinates can be exactly represented.

Step S402: Cover a bounding box with coordinates represented exactly of a polygon with holes by using a grid with coordinates represented exactly.

After translation transformation is performed on the polygon with holes, an axis-aligned bounding box of the polygon with holes is covered by using a grid with coordinates represented exactly. Assuming that the resolution of the Manhattan polygon with holes set by the user is $e+f*2^n$, e, f∈ $^+$, then a side length of each small grid may be set as $e+f*2^n$, then a rectangle formed by small grids is generated in the first quadrant of the Cartesian coordinate system, so that the rectangle can just cover the bounding box with coordinates represented exactly of the polygon with holes, as shown in 602 of FIG. 6. It can be known that the rectangle is formed by w*h small grids, where w $$w=\left\lceil\frac{x_{max}(\text{new})-x_{min}(\text{new})}{e+f*2^n}\right\rceil,\ h=\left\lceil\frac{y_{max}(\text{new})-y_{min}(\text{new})}{e+f*2^n}\right\rceil.$$

Figure 6:
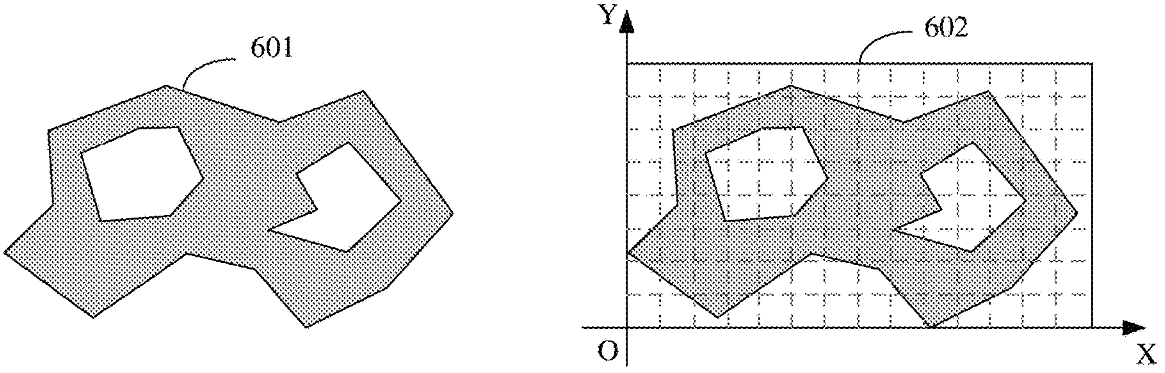
FIG. 6 is a schematic diagram of an original polygon and a bounding box with coordinates represented exactly corresponding to the original polygon according to one or more illustrative aspects described herein.

For example, in the example shown in 602 of FIG. 6, w=14, h=8.

Step S403: Determine all grids that intersect with an effective region of the polygon with holes and record them as effective grids.

In this aspect of this application, the effective grids are divided into two types: 1) A center point is within the effective region of the polygon with holes, and a boundary may or may not intersect with the polygon with holes; and 2) A center point is outside the effective region of the polygon with holes, but a boundary intersects with the polygon with holes.

In some aspects, the foregoing step S403 can be implemented through the following steps.

Step S4031: Generate a center point of each small grid, as shown by the gray dot in 701 in FIG. 7.

Step S4032: Determine whether each center point is within the effective region of the polygon with holes.

Figure 7:
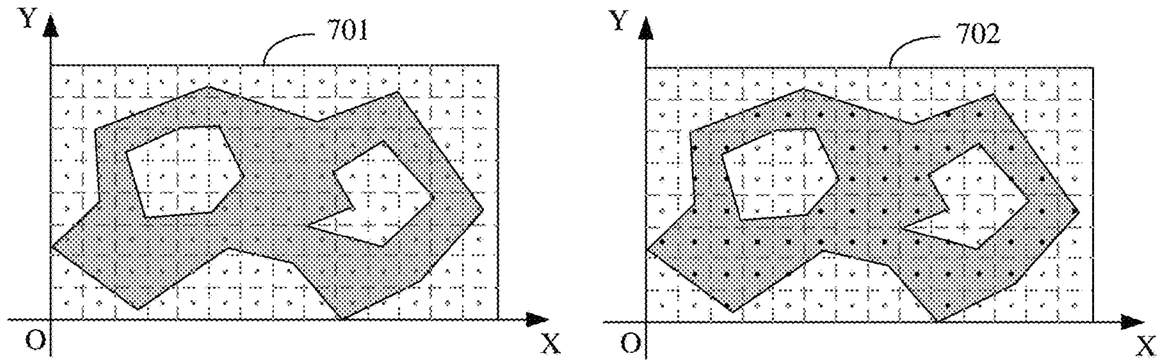
FIG. 7 is a schematic diagram of determining an internal and external relationship between a center point of each grid and a polygon with holes according to one or more illustrative aspects described herein.

If the center point is within the effective region of the polygon with holes, the center point is marked as a first type center point, such as the black dot in 702 in FIG. 7. If the center point is outside the effective region of the polygon with holes, the center point is not processed temporarily.

Step S4033: Determine whether all small grids corresponding to the center points located outside the polygon with holes intersect with the polygon with holes.

Figure 8:
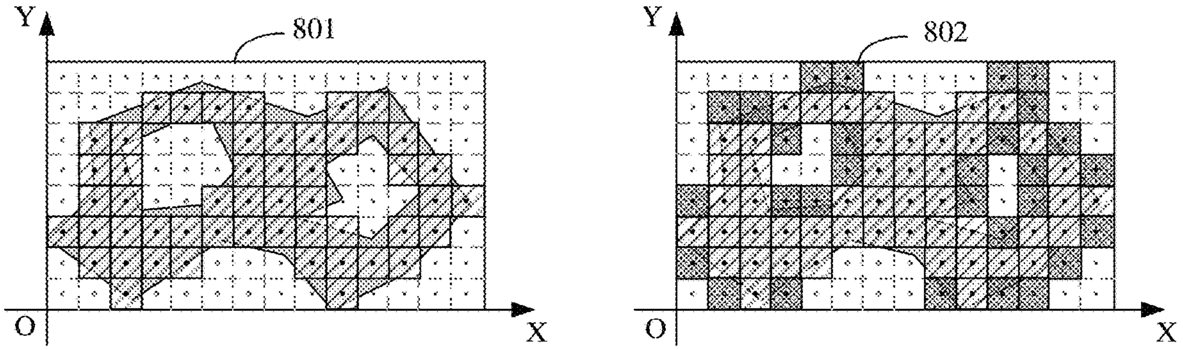
FIG. 8 is a schematic diagram of coverage of a polygon with holes by each effective grid according to one or more illustrative aspects described herein.

If the small grid corresponding to the center point outside the effective region of the polygon with holes intersects with the polygon with holes, the center point is marked as a first type center point. As shown in FIG. 8, 801 includes the center point in the small grid filled with light gray triangles.

In this aspect of this application, the small grid corresponding to the first type center point is referred to as an effective grid. In this aspect of this application, the small grid corresponding to the center point located inside the polygon with holes may not cover the polygon with holes, as shown in 801 of FIG. 8. However, it has been observed that the regions that cannot be covered are often: although the center point of the small grid is not within the effective region of the polygon with holes, the boundary has an intersection with the side of the polygon with holes. To identify this type of effective grids, the method adopted in this aspect of this application is as follows: construct an AABB tree using the sides of polygons with holes as an input, and then determine whether four boundaries of each other center point that is not marked as the first type center point intersect with the AABB tree, and if so, determine the center point as the first type center point. It can be found that in this case, the grid corresponding to the first type center point can perfectly cover the original polygon with holes, as shown in 802 of FIG. 8.

Step S404: Generate a Manhattan polygon with holes with coordinates represented exactly according to the effective grid.

After the effective grid is obtained, a Manhattan polygon with holes with coordinates represented exactly can be generated through the following steps:

Step S4041: Define a set S that stores boundary sides.

Step S4042: Obtain four effective boundaries of each effective grid.

Step S4043: Sequentially determine whether each effective boundary already exists in the set S.

If an effective boundary already exists in the set S, step S4044 is performed. If the effective boundary does not exist in the set S, step S4045 is performed.

Step S4044: Delete the effective boundary from the set S.

Step S4045: Put the boundary into the set S.

Step S4046: Construct a Manhattan polygon with holes with coordinates represented exactly by using the set S as an input.

If an effective boundary is a shared side of two effective grids, the effective boundary is inside the polygon with holes. Therefore, when a first effective grid is processed, the effective boundary is added to the set S. When a second effective grid is processed, the effective boundary is deleted from the set S. Then, after the determination of all effective boundaries is performed, the sides in the set S are all the boundary sides of the polygon with holes. In this case, a legal polygon with holes can be constructed based on the effective boundaries in the set S. Since the effective grid forms a complete coverage of the polygon with holes, the area of the final result is less than that of the original polygon with holes.

Figure 9:
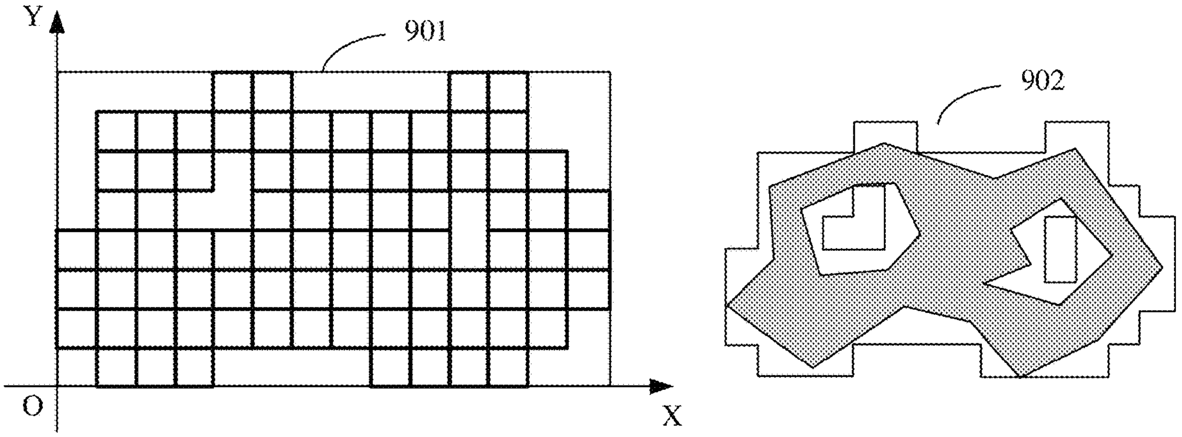
FIG. 9 is a schematic diagram of generating a Manhattan polygon with holes with coordinates represented exactly by an effective boundary of each effective grid.

FIG. 9 is a schematic diagram of generating a Manhattan polygon with holes with coordinates represented exactly by an effective boundary of each effective grid. The bold line segment in 901 of FIG. 9 is the boundary corresponding to the effective grid, and 902 is the corresponding Manhattan polygon with holes generated according to the effective grid boundary.

Step S405: Translate the Manhattan polygon with holes to an original position.

Since translation transformation is performed on the original polygon with holes in step S401, it is convenient to generate the effective grid. Therefore, finally, the result generated in step S404 needs to be translated by $V_2=(-x_{min}(\text{new}), -y_{min}(\text{new}))$ in order to restore to an initial position of the original polygon with holes. Since the coordinates of $V_2$ can be exactly represented, it can be ensured that the coordinates of the translated Manhattan polygon with holes can also be exactly represented.

In this aspect of this application, it is defined that: a point is referred to be within the effective region of a polygon with holes if the point is inside the outer boundary of the polygon with holes and outside all holes. Correspondingly, the foregoing step S4032 "determine whether each center point is within the effective region of the polygon with holes" may have the following three implementations:

1. Use a ray method to determine a positional relationship between a point and a polygon.

A ray with this point as a vertex is generated, and then a quantity of intersections between the ray and the polygon are calculated. If the quantity of intersections is an even number, it means that the point is outside the effective region of the polygon. Otherwise, it means that the point is within the effective region of the polygon.

2. Use a fillPoly function provided in an OpenCV library.

The fillPoly function is provided in the OpenCV library, which can be used to fill graphics of any shape and can also be used to draw polygons. The following steps may be used to obtain the center point inside a polygon with holes:

Step S321A: Construct a canvas with a pixel size of w*h according to w,h obtained by calculation in step S402.

Step S322A: Scale the polygon with holes in equal proportions, and then invoke a fillPoly function to draw the polygon with holes on the canvas.

Step S323A: If a value of each pixel on the canvas is equal to a drawing color, it means that the originally corresponding center point is inside the polygon with holes and is marked as the first type center point; otherwise, it means that the corresponding center point is outside the polygon with holes.

The advantage of this method is that it is efficient, but the disadvantage is that it depends on the OpenCV library function.

3. Use a depth/breadth-first search approach.

By observing 702 in FIG. 7, it can be found that whether the center point is inside or outside the polygon with holes, the adjacent vertices have the same internal and external properties, unless connection between them crosses the boundary of the polygon with holes (including sides on the outer boundary and sides on the internal holes). Therefore, the depth-first search method or the breadth-first search method can be used to more quickly obtain the internal and external relationships between the center point and the polygon with holes. Taking a breadth-first search strategy as an example, in this case, this can be implemented through the following steps:

Step S321B: Set states of all grid center points to "uncalculated".

Step S322B: Define a first-in-first-out queue Q.

Step S323B: Determine a positional relationship of a first center point by using a ray method, and set the state of the first center point to "internal" or "external" according to a determination result, and then put the center point into the queue Q.

Step S324B: When the queue is not empty, repeat step S325B to step S329B.

Step S325B: Take out a head element P from the queue Q to obtain the state s (s is only possible to be "internal" or "external").

Step S326B: If P is not a leftmost element and a state of the element $p_{left}$ on a left side is "uncalculated", construct a line segment (P, $p_{left}$) and calculate a quantity of intersections between the line segment and the polygon with holes. If the quantity of intersections is an even number, set the state of $p_{left}$ is equal to the state of p. If the quantity of intersections is an odd number, set the state of $p_{left}$ to be different from the state of p; and finally put $p_{left}$ into Q.

Step S327B: If P is not a rightmost element and a state of the element $p_{right}$ on a right side is "uncalculated", construct a line segment (P, $p_{right}$) and calculate a quantity of intersections between the line segment and the polygon with holes. If the quantity of intersections is an even number, set the state of $p_{right}$ is equal to the state of p. If the quantity of intersections is an odd number, set the state of $p_{right}$ to be different from the state of p; and finally put $p_{right}$ into Q.

Step S328B: If P is not a topmost element and a state of the element $p_{up}$ on an upper side is "uncalculated", construct a line segment (P, $p_{up}$) and calculate a quantity of intersections between the line segment and the polygon with holes. If the quantity of intersections is an even number, set the state of $p_{up}$ is equal to the state of p. If the quantity of intersections is an odd number, set the state of $p_{up}$ to be different from the state of p; and finally put $p_{up}$ into Q.

Step S329B: If p is not a lowermost element and a state of the element $p_{down}$ on a lower side is "uncalculated", construct a line segment (p, $p_{down}$) and calculate a quantity of intersections between the line segment and the polygon with holes. If the quantity of intersections is an even number, set the state of $p_{down}$ is equal to the state of p. If the quantity of intersections is an odd number, set the state of $p_{down}$ to be different from the state of p; and finally put $p_{down}$ into Q.

Through the foregoing step S321B to step S329B, the states of all grid points are obtained.

In the foregoing algorithm, no matter whether the center point of the grid is located inside or outside the polygon with holes, it only needs to calculate the intersection once, and because the adjacency relationship between the grids is used, it only needs to calculate the quantity of intersections between the line segment and the polygon with holes. Compared with the ray method for obtaining the quantity of intersections, the computing efficiency is higher because it has fewer intersections.

The aspects of this application further provide a polygon processing method. The polygon processing method can be used to obtain a general Manhattan polygon with holes, that is, the coordinates of the Manhattan polygon are not exactly represented.

The input of some geometric algorithms only needs to meet the Manhattan property and does not require the coordinates to be exactly represented, such as a Manhattan polygon interface with holes provided in the Boost library. In this aspect of this application, such a Manhattan polygon with holes is referred to as a general Manhattan polygon with holes. In response to this requirement, the foregoing implementation process of generating the Manhattan polygon with coordinates represented exactly only needs to be slightly modified to generate the general Manhattan polygon with holes. Each step is described below.

Step S501: Determine an axis-aligned bounding box of an original polygon with holes.

Step S502: If the axis-aligned bounding box is not a square, stretch the polygon in an x direction or a y direction, to make the axis-aligned bounding box of the polygon become a square.

During implementation of this step, if the x-axis direction corresponds to a length of the axis-aligned bounding box, the center point of the polygon is used as a stretching reference point and the polygon is stretched in the y-axis direction. If the y-axis direction corresponds to a length of the axis-aligned bounding box, the polygon is stretched in the x-axis direction.

Step S503: Translate the stretched polygon, so that a lower left corner of the axis-aligned bounding box coincides with a coordinate origin.

Step S504: Determine a side length of a grid according to a predefined resolution (in this case, the coordinates of the grid are not necessary to be exactly represented), and then use the foregoing step S403 and step S404 to generate a general Manhattan polygon with holes.

In this aspect of this application, the predefined resolution may be represented by P*P, where P is a positive integer greater than 1. For example, if P is 10, the resolution is 10*10. During implementation of this step, the side length of the axis-aligned bounding box of the square may be divided by P to obtain the grid side length. For example, if the side length of the axis-aligned bounding box obtained after stretching is 100 and P is 10, the grid side length obtained is 100/10=10.

Since the general polygon with holes does not require the coordinates to be exactly represented, there is no need to impose strict restrictions on the grid that coordinates can be exactly represented. In this way, the square formed by the small grids is equivalent to the axis-aligned bounding box of the stretched polygon.

Figure 10:
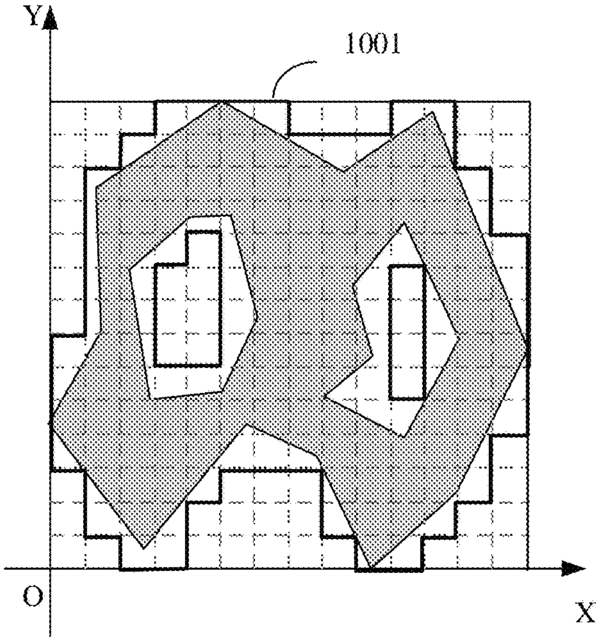
FIG. 10 is a schematic diagram of a general Manhattan polygon according to one or more illustrative aspects described herein.

After the grid side length is determined, the square axis-aligned bounding box obtained through stretching is divided based on the grid side length to obtain P*P small grids. Then, the foregoing step S403 and step S404 are used to determine the effective grids intersecting with the stretched polygons from the P*P small grids, and then based on the connecting sides of the effective grids, the effective connecting sides are determined, and finally based on a plurality of effective connecting sides, a general Manhattan polygon with holes is generated as shown in FIG. 10. A polygon 1001 formed by the bold line segments in FIG. 10 is a general Manhattan polygon with holes.

Step S505: Translate the general Manhattan polygon with holes generated in step S505 to the initial position according to the translation vector in step S503.

Step S506: Compress, according to the stretch transformation amount determined in step S502, the general Manhattan polygon with holes obtained in step S505 to restore the original length and width.

Figure 11:
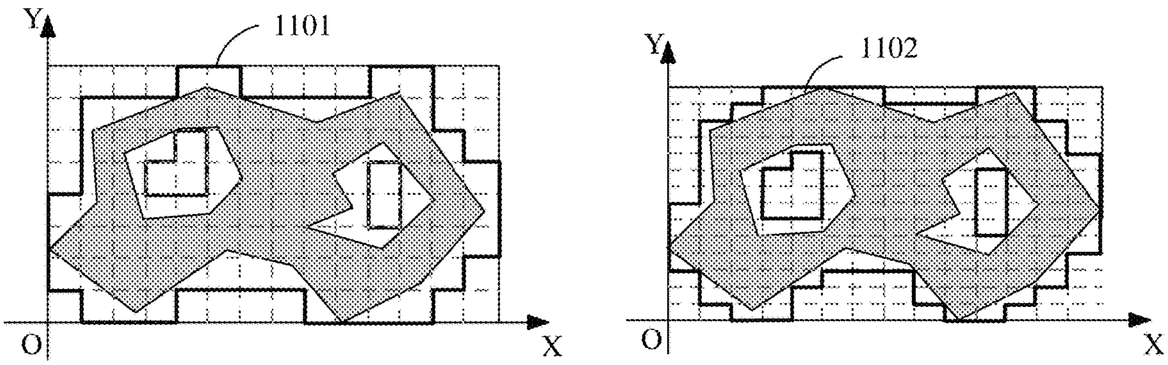
FIG. 11 is a schematic diagram of approximating the same polygon into a Manhattan polygon with coordinates represented exactly and a general Manhattan polygon.

FIG. 11 is a schematic diagram of approximating the same polygon into a Manhattan polygon with coordinates represented exactly and a general Manhattan polygon. 1101 is a Manhattan polygon with holes with coordinates represented exactly; and 1102 is a general Manhattan polygon with holes. By comparing 1101 and 1102 in FIG. 11, it can be found that for the general Manhattan polygon 1102, although it is not ensured that the coordinates can be exactly represented, the general Manhattan polygon with holes envelopes the original polygon with holes in a tighter manner and has a closer shape to that of the original polygon with holes. This is a better choice for application scenarios that do not require coordinates to be exactly represented.

In a practical application, there is a slightly less common but still important way to extend, that is, the angles between all sides of the polygon with holes and the positive x direction are required to be an integral multiple of 45°. In this aspect of this application, such a shape is referred to as a Manhattan polygon_45 with holes. The Manhattan polygon_45 with holes still simplifies the implementation of many geometric algorithms and provides many optimization opportunities. Geometry algorithms optimized for Manhattan polygon_45 with holes are, on average, 50 times faster than geometry algorithms for polygons with holes at any angle.

The aspects of this application further provide a polygon processing method. A Manhattan polygon_45 with holes can be generated using the polygon processing method. During implementation, after step S405, the generated Manhattan polygon with holes with coordinates represented exactly may be modified through the following step S406 to step S408, and each step is described below.

Step S406: Perform step S407 and step S408 for the outer boundary of the Manhattan polygon with holes with coordinates represented exactly and all internal holes (all of which are Manhattan polygons).

Step S407: Determine whether each side of the Manhattan polygon with holes with coordinates represented exactly meet the following two conditions: 1) A next side forms a 900 left-turn relationship with a current side; and 2) After the current side and the next side form a left-turn relationship, a line segment formed by a starting point of the current side and an end point of the next side does not intersect with the original polygon with holes. If the foregoing two conditions are met, the current side and the next side are deleted and a new line segment is inserted. As shown in the lower right corner of 1201 in FIG. 12, e1 and e2 form a 90° left-turn relationship. A line segment e3 formed by the starting point of e1 and the end point of e2 does not intersect with the original polygon with holes, so e1 and e2 are deleted and e3 is inserted.

Step S408: If the next side of each side of the Manhattan polygon with holes with coordinates represented exactly remains unchanged, generate a hypotenuse that turns 45° to the left with a length of $\sqrt{2}*|e_1|$, and a new line segment from an end point of the hypotenuse to an end point of the next side, and then determine the following two conditions: 1) The hypotenuse has no intersection with the polygon with holes; and 2) The new line segment has no intersection with the polygon with holes. If the foregoing two conditions are met, the next side is deleted and the hypotenuse and the new line segment are inserted. As shown in the lower left corner of 1201 in FIG. 12, e4 and e5 have the same direction. In this case, a hypotenuse e6 that turns 45° to the left and a new line segment e7 connecting the end point of the hypotenuse e6 to the end point of e5 are generated. Since e6 and e7 have no intersection with the original polygon, e5 is deleted and e6 and e7 are inserted.

Figure 12:
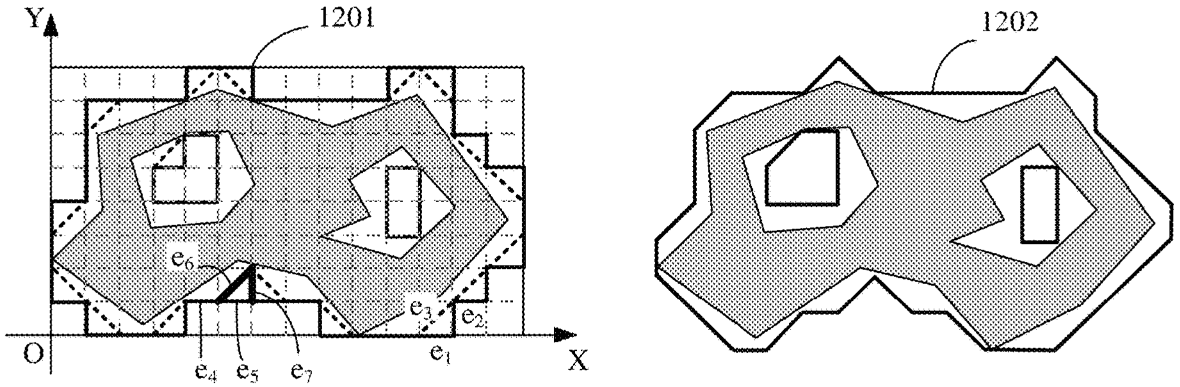
FIG. 12 is a schematic diagram of a 45-degree Manhattan polygon according to one or more illustrative aspects described herein.

Through the foregoing step S406 to step S408, the Manhattan polygon_45 with holes shown as 1202 in FIG. 12 can be obtained.

By comparing 902 in FIGS. 9 and 1202 in FIG. 12, it can be found that under the premise of ensuring that the coordinates can be exactly represented, the Manhattan polygon_45 with holes envelopes the original polygon with holes in a tighter manner and has a closer shape to that of the original polygon with holes. This is a better choice for application scenarios that do not require all sides to be horizontally or vertically straight.

Practical results show that after the generation method provided in the aspects of this application is used to process the polygon with holes at any angle, a floating point computing kernel can be used to implement a series of computing geometry algorithms and ensure the correctness of the result. Prior to this, for the polygon with holes at any angle, to ensure the correctness of the calculation result, a computing kernel with exact determination and exact construction are used. However, the efficiency of this computing kernel is two orders of magnitude lower than the floating point computing kernel. The beneficial effects produced by applying the methods of the aspects of this application in a series of tools for the 2 UV expansion project are as follows:

1) Mega and Nest tools: Before the Minkowski sum is calculated, the algorithm provided in the aspects of this application is used to first generate a Manhattan polygon with holes with coordinates represented exactly, and then the Minkowski sum is calculated based on the floating point computing kernel. It is found that the running speed can be 2 orders of magnitude faster. Since calculating the Minkowski sum is the most time-consuming part of the Mega and Nest tools, after improvement, the running efficiency of these two tools are also improved by 1-2 orders of magnitude.

2) Reposition tool: Before a gap of the polygon with holes is calculated, a Manhattan polygon_45 with holes is first generated, and then a floating point computing kernel is used to generate the gap and calculate a Voronoi diagram. Although the final compact bounding box generated is not as exact as the original, it can improve the computing efficiency of the Reposition tool by 2 orders of magnitude, thereby meeting practical requirements (previously, when the Voronoi diagram is calculated by using a computing kernel with exact determination and exact construction, it took too much time and the Reposition tool cannot meet practical needs).

3) Shift tool: First, the method provided in the aspects of this application is used to generate a general Manhattan polygon to better approximate the original polygon with holes, and then an AABB tree is constructed based on the floating point computing kernel. Since all constructions and queries do not generate new floating point numbers, the robustness of calculation can be ensured, and construction efficiency and query efficiency can be improved hundreds of times.

It can be understood that, in the aspects of this application, contents of user information such as chat information of a chat partner, communication content, and other related data are involved. When the aspects of this application are applied to specific products or technologies, permission or consent of the user is required, and the collection, use and processing of relevant data need to comply with the relevant laws, regulations and standards of relevant countries and regions.

The following continues to describe an illustrative structure in which the polygon processing apparatus 443 provided in the aspects of this application is implemented as a software module. In some aspects, as shown in FIG. 2, the software module stored in the polygon processing apparatus 443 of the memory 440 may include:

a first determining module 4431, configured to obtain a to-be-processed original polygon, and determine a first target bounding box of the original polygon;

a first moving module 4432, configured to determine a motion vector based on the first target bounding box, and move the original polygon and the first target bounding box based on the motion vector;

a second determining module 4433, configured to determine a second target bounding box of an original polygon obtained after movement, and divide the second target bounding box into a plurality of squares, a lower left vertex of the second target bounding box being a coordinate origin;

a polygon generation module 4434, configured to determine a square among the plurality of squares that has an intersection region with the original polygon obtained after movement as a target square, and generate a target polygon based on connecting sides of the target square, where connecting sides of the target polygon are a part of the connecting sides of the target square; and a second moving module 4435, configured to move the target polygon to a position corresponding to the original polygon based on the motion vector.

In some aspects, the first determining module 4431 is further configured to:

in a case of determining that a target polygon whose vertex coordinates meet an exact representation condition needs to be generated, determine an axis-aligned bounding box of the original polygon;

obtain a preset coordinate numerical accuracy, and modify, based on the coordinate numerical accuracy, vertex coordinates of diagonal vertices of the axis-aligned bounding box to obtain modified vertex coordinates, where the modified vertex coordinates meet the exact representation condition; and determine the first target bounding box of the original polygon based on the modified vertex coordinates.

In some aspects, the first moving module 4432 is further configured to:

determine the motion vector based on vertex coordinates of a lower left vertex of the first target bounding box; and move the original polygon and the first target bounding box based on the motion vector, where a lower left vertex of a first target bounding box obtained after movement coincides with the coordinate origin.

In some aspects, the second determining module 4433 is further configured to:

determine a first length and a first width of the first target bounding box;

obtain a preset square side length, where a decimal part of the square side length is capable of exactly dividing the coordinate numerical accuracy;

determine a second length of the second target bounding box based on the first length and the square side length, where the second length is greater than or equal to the first length, and the second length is capable of exactly dividing the square side length;

determine a second width of the second target bounding box based on the first width and the square side length, where the second width is greater than or equal to the first width, and the second width is capable of exactly dividing the square side length;

determine the coordinate origin as the lower left vertex of the second target bounding box, and determine the second target bounding box based on the coordinate origin, the second length, and the second width; and divide the second target bounding box into a plurality of squares according to the square side length.

In some aspects, the first determining module 4431 is further configured to:

in a case of determining that a target polygon whose vertex coordinates meet an exact representation condition does not need to be generated, determine an axis-aligned bounding box of the original polygon;

determine a third length and a third width of the axis-aligned bounding box;

determine a stretch ratio of the original polygon to the axis-aligned bounding box based on the third length and the third width;

perform, based on the stretch ratio, stretching processing on the original polygon and the axis-aligned bounding box to obtain a stretched polygon and a stretched axis-aligned bounding box, where the stretched axis-aligned bounding box is a square; and determine the stretched axis-aligned bounding box as the first target bounding box.

In some aspects, the apparatus further includes:

a third determining module, configured to determine a compression ratio based on the stretch ratio; and a compression module, configured to perform, based on the compression ratio, compression processing on the target polygon that is moved to the position corresponding to the original polygon to obtain a compressed target polygon.

In some aspects, the second determining module 4433 is further configured to:

obtain a first target bounding box obtained after movement, and determine the first target bounding box obtained after movement as the second target bounding box of the original polygon obtained after movement;

obtain a preset quantity of squares, and determine a square side length based on the quantity of squares and a side length of the second target bounding box; and divide the second target bounding box into a plurality of squares based on the square side length.

In some aspects, the polygon generation module 4434 is further configured to:

determine a center point of each square, and determine a square whose center point is located inside the original polygon obtained after movement as the target square; and determine a square whose center point is not located inside the original polygon obtained after movement and whose square boundary intersects with the polygon as the target square.

In some aspects, the polygon generation module 4434 is further configured to:

determine an effective connecting side from the connecting sides of the target square, where the effective connecting side is not shared by two target squares;

establish, based on a plurality of effective connecting sides, a mapping set between endpoints of the effective connecting sides and the effective connecting sides;

determine, based on the mapping set, target endpoints capable of forming a ring shape, and generate a simple polygon based on the target endpoints capable of forming the ring shape;

in a case that a quantity of generated simple polygons is at least two, determine an inclusion relationship between the at least two simple polygons;

determine, based on the inclusion relationship between the at least two simple polygons, at least one first simple polygon as a new outer boundary from the at least two simple polygons;

determine an internal hole corresponding to each first simple polygon based on a second simple polygon, where the second simple polygon is a polygon other than the first simple polygon in the at least two simple polygons; and generate the target polygon based on each first simple polygon and the internal hole corresponding to each first simple polygon.

In some aspects, the polygon generation module 4434 is further configured to:

obtain four connecting sides of each target square;

sequentially determine whether each connecting side exists in a preset effective connecting side set;

in a case of determining that the connecting side exists in the effective connecting side set, delete the connecting side from the effective connecting side set;

in a case of determining that the connecting side does not exist in the effective connecting side set, add the connecting side to the effective connecting side set; and determine each connecting side in the effective connecting side set as the effective connecting side.

In some aspects, in a case of determining that a target polygon whose vertex coordinates meet an exact representation condition needs to be generated, the apparatus further includes:

a fifth determining module, configured to determine each connecting side of the target polygon;

a sixth determining module, configured to in a case that an $i^{th}$ connecting side and an $(i+1)^{th}$ connecting side form a left-turn relationship, and a first candidate connecting side formed by a starting point of the $i^{th}$ connecting side and an end point of the $(i+1)^{th}$ connecting side has no intersection with the original polygon, delete the $i^{th}$ connecting side and the $(i+1)^{th}$ connecting side, and determine the first candidate connecting side as a connecting side of the target polygon;

a connecting side generation module, configured to: in a case that the $i^{th}$ connecting side and the $(i+1)^{th}$ connecting side have the same direction, generate a second candidate connecting side and a third candidate connecting side, where a starting point of the second candidate connecting side is an end point of the $i^{th}$ connecting side, the second candidate connecting side forms a 45° left-turn relationship with the $i^{th}$ connecting side, a starting point of the third candidate connecting side is an end point of the second candidate connecting side, an end point of the third candidate connecting side is the end point of the $(i+1)^{th}$ connecting side, and the third candidate connection side is the same length as the $i^{th}$ connecting side; and a seventh determining module, configured to in a case of determining that both the second candidate connecting side and the third candidate connecting side have no intersection with the original polygon, delete the $(i+1)^{th}$ connecting side, and determine the second candidate connecting side and the third candidate connecting side as connecting sides of the target polygon.

Descriptions of the polygon approximation apparatus in the aspects of this application are similar to the descriptions of the foregoing method aspects. The apparatus aspects have beneficial effects similar to those of the method aspects. Refer to descriptions in the method aspects of this application for technical details undisclosed in the apparatus aspects of this application.

According to an aspect of the aspects of this application, a computer program product or a computer program is provided, the computer program product or the computer program including computer instructions, the computer instructions being stored in a computer-readable storage medium. A processor of a computer device reads the computer instructions from the computer-readable storage medium, and executes the computer instructions, to cause the computer device to perform the foregoing polygon processing method in the aspects of this application.

An aspect of this application provides a computer-readable storage medium storing executable instructions. When the executable instructions are executed by a processor, the processor is caused to perform the polygon processing method in the aspects of this application, such as the polygon processing method shown in FIG. 3, FIG. 4, and FIG. 5.

In some aspects, the computer-readable storage medium may be a memory such as an FRAM, a ROM, a PROM, an EPROM, an EEPROM, a flash memory, a magnetic surface memory, an optical disk, or a CD-ROM; or may be any device including one of or any combination of the foregoing memories.

In some aspects, the executable instructions may be written in any form of programming language (including a compiled or interpreted language, or a declarative or procedural language) by using the form of a program, software, a software module, a script or code, and may be deployed in any form, including being deployed as an independent program or being deployed as a module, a component, a subroutine, or another unit suitable for use in a computing environment.

In an example, the executable instructions may, but do not necessarily, correspond to a file in a file system, and may be stored in a part of a file that saves another program or other data, for example, be stored in one or more scripts in a hypertext markup language (HTML) file, stored in a file that is specially used for a program in discussion, or stored in the plurality of collaborative files (for example, be stored in files of one or modules, subprograms, or code parts).

In an example, the executable instructions may be deployed to be executed on a computing device, or deployed to be executed on a plurality of computing devices at the same location, or deployed to be executed on a plurality of computing devices that are distributed in a plurality of locations and interconnected by using a communication network.

The foregoing descriptions are merely aspects of this application and are not intended to limit the protection scope of this application. Any modification, equivalent replacement, or improvement made without departing from the spirit and range of this application shall fall within the protection scope of this application.

What is claimed is:

1. A polygon processing method, performed by a data processing device, the method comprising:
- determining a second target bounding box of a moved polygon;
- dividing the second target bounding box into a plurality of squares, wherein a predetermined point of the second target bounding box serves as a coordinate origin;
- determining a square among the plurality of squares that has an intersection region with the moved polygon as a target square;
- generating a target polygon based on connecting sides of the target square, wherein connecting sides of the target polygon include at least a part of the connecting sides of the target square; and
- moving the target polygon to a position corresponding to an original polygon based on a motion vector.

2. The method according to claim 1, further comprising:
- determining the motion vector based on a first target bounding box of the original polygon; and
- moving the original polygon and the first target bounding box based on the motion vector to result in the moved polygon.

3. The method according to claim 1, further comprising determining the second target bounding box by:
- based on the target polygon requiring vertex coordinates meeting an exact representation condition, determining an axis-aligned bounding box of the polygon;
- obtaining a preset coordinate numerical accuracy, and modifying, based on the coordinate numerical accuracy, vertex coordinates of diagonal vertices of the axis-aligned bounding box to obtain modified vertex coordinates, wherein the modified vertex coordinates meet the exact representation condition; and
- determining the second target bounding box based on the modified vertex coordinates.

4. The method according to claim 2, wherein the predetermined point of the second target bounding box is a lower left vertex of the second target bounding box, and wherein the determining the motion vector based on the first target bounding box, and moving the original polygon and the first target bounding box based on the motion vector comprises:
- determining the motion vector based on vertex coordinates of a lower left vertex of the first target bounding box; and
- moving the original polygon and the first target bounding box based on the motion vector, wherein a lower left vertex of the second target bounding box coincides with the coordinate origin.

5. The method according to claim 2, wherein the determining the second target bounding box, and dividing the second target bounding box into a plurality of squares comprises:
- determining a first length and a first width of the first target bounding box;
- obtaining a preset square side length, wherein a decimal part of the square side length is capable of exactly dividing a coordinate numerical accuracy;
- determining a second length of the second target bounding box based on the first length and the square side length, wherein the second length is greater than or equal to the first length, and the second length is capable of exactly dividing the square side length;
- determining a second width of the second target bounding box based on the first width and the square side length, wherein the second width is greater than or equal to the first width, and the second width is capable of exactly dividing the square side length;
- determining the coordinate origin as the lower left vertex of the second target bounding box, and determining the second target bounding box based on the coordinate origin, the second length, and the second width; and
- dividing the second target bounding box into a plurality of squares according to the square side length.

6. The method according to claim 1, wherein the determining the second target bounding box comprises:
- based on the target polygon not requiring coordinates meeting an exact representation condition, determining an axis-aligned bounding box of the polygon;
- determining a third length and a third width of the axis-aligned bounding box;
- determining a stretch ratio of the polygon to the axis-aligned bounding box based on the third length and the third width;
- performing, based on the stretch ratio, stretching processing on the polygon and the axis-aligned bounding box to obtain a stretched polygon and a stretched axis-aligned bounding box, wherein the stretched axis-aligned bounding box is a square; and determining the stretched axis-aligned bounding box as the second target bounding box.

7. The method according to claim 6, wherein after the moving the target polygon to the position corresponding to the original polygon based on the motion vector, the method further comprises:

determining a compression ratio based on the stretch ratio; and performing, based on the compression ratio, compression processing on the target polygon that is moved to the position corresponding to the original polygon to obtain a compressed target polygon.

8. The method according to claim 6, wherein the determining the second target bounding box, and dividing the second target bounding box into a plurality of squares comprises:

obtaining a preset quantity of squares, and determining a square side length based on the quantity of squares and a side length of the second target bounding box; and dividing the second target bounding box into a plurality of squares based on the square side length.

9. The method according to claim 1, wherein the determining the square among the plurality of squares that has the intersection region with the moved polygon as the target square comprises:

determining a center point of each square, and determining a square whose center point is located inside the original polygon obtained after movement as the target square; and determining a square whose center point is not located inside the original polygon obtained after movement and whose square boundary intersects with the original polygon obtained after movement as the target square.

10. The method of claim 1, wherein the generating the target polygon based on connecting sides of the target square comprises:

determining an effective connecting side from the connecting sides of the target square, wherein the effective connecting side is not shared by two target squares;

establishing, based on a plurality of effective connecting sides, a mapping set between endpoints of the effective connecting sides and the effective connecting sides;

determining, based on the mapping set, target endpoints capable of forming a ring shape, and generating a simple polygon based on the target endpoints capable of forming the ring shape;

based on a determination that a quantity of generated simple polygons is at least two, determining an inclusion relationship between the at least two simple polygons;

determining, based on the inclusion relationship between the at least two simple polygons, at least one first simple polygon as a new outer boundary of the target polygon from the at least two simple polygons;

determining an internal hole corresponding to each first simple polygon based on a second simple polygon, wherein the second simple polygon is a polygon other than the first simple polygon in the at least two simple polygons; and generating the target polygon based on each first simple polygon and the internal hole corresponding to each first simple polygon.

11. The method according to claim 10, wherein the determining an effective connecting side from the connecting sides of the target square comprises:

obtaining four connecting sides of each target square;

sequentially determining whether each connecting side exists in a preset effective connecting side set;

based on determining that the connecting side exists in the effective connecting side set, deleting the connecting side from the effective connecting side set;

based on determining that the connecting side does not exist in the effective connecting side set, adding the connecting side to the effective connecting side set; and determining each connecting side in the effective connecting side set as the effective connecting side.

12. The method of claim 1, wherein based on determining that the target polygon requires vertex coordinates meeting an exact representation condition, the method further comprises:

determining each connecting side of the target polygon;

in a case that an $i^{th}$ connecting side and an $(i+1)^{th}$ connecting side form a left-turn relationship, and a first candidate connecting side formed by a starting point of the $i^{th}$ connecting side and an end point of the $(i+1)^{th}$ connecting side has no intersection with the original polygon, deleting the $i^{th}$ connecting side and the $(i+1)^{th}$ connecting side, and determining the first candidate connecting side as a connecting side of the target polygon, wherein i=1, 2, . . . , N, and N is a total quantity of connecting sides of the target polygon;

in a case that the $i^{th}$ connecting side and the $(i+1)^{th}$ connecting side have the same direction, generating a second candidate connecting side and a third candidate connecting side, wherein a starting point of the second candidate connecting side is an end point of the it connecting side, the second candidate connecting side forms a 45° left-turn relationship with the $i^{th}$ connecting side, a starting point of the third candidate connecting side is an end point of the second candidate connecting side, an end point of the third candidate connecting side is the end point of the $(i+1)^{th}$ connecting side, and the third candidate connection side is the same length as the $i^{th}$ connecting side; and in a case that both the second candidate connecting side and the third candidate connecting side have no intersection with the original polygon, deleting the $(i+1)^{th}$ connecting side, and determining the second candidate connecting side and the third candidate connecting side as connecting sides of the target polygon.

13. One or more non-transitory computer readable media comprising computer readable instructions which, when executed by a processor, configure a data processing system to perform:

determining a second target bounding box of a moved polygon;

dividing the second target bounding box into a plurality of squares, wherein a predetermined point of the second target bounding box serves as a coordinate origin;

determining a square among the plurality of squares that has an intersection region with the moved polygon as a target square;

generating a target polygon based on connecting sides of the target square, wherein connecting sides of the target polygon include at least a part of the connecting sides of the target square; and moving the target polygon to a position corresponding to an original polygon based on a motion vector.

14. The non-transitory computer readable media according to claim 13, wherein the computer readable instructions, when executed by the processor, further configure the data processing system to perform:

determining the motion vector based on a first target bounding box of the original polygon; and moving the original polygon and the first target bounding box based on the motion vector to result in the moved polygon.

15. The non-transitory computer readable media according to claim 14, wherein the computer readable instructions, when executed by the processor, further configure the data processing system to perform:

determining the second target bounding box of the original polygon by:

based on the target polygon requiring vertex coordinates meeting an exact representation condition, determining an axis-aligned bounding box of the polygon;

obtaining a preset coordinate numerical accuracy, and modifying, based on the coordinate numerical accuracy, vertex coordinates of diagonal vertices of the axis-aligned bounding box to obtain modified vertex coordinates, wherein the modified vertex coordinates meet the exact representation condition; and determining the first target bounding box of the original polygon based on the modified vertex coordinates.

16. The non-transitory computer readable media according to claim 14, wherein the predetermined point of the second target bounding box is a lower left vertex of the second target bounding box, and wherein the determining the motion vector based on the first target bounding box, and moving the original polygon and the first target bounding box based on the motion vector comprises:

determining the motion vector based on vertex coordinates of a lower left vertex of the first target bounding box; and moving the original polygon and the first target bounding box based on the motion vector, wherein a lower left vertex of the second target bounding box coincides with the coordinate origin.

17. The non-transitory computer readable media according to claim 14, wherein the determining the second target bounding box, and dividing the second target bounding box into a plurality of squares comprises:

determining a first length and a first width of the first target bounding box;

obtaining a preset square side length, wherein a decimal part of the square side length is capable of exactly dividing a coordinate numerical accuracy;

determining a second length of the second target bounding box based on the first length and the square side length, wherein the second length is greater than or equal to the first length, and the second length is capable of exactly dividing the square side length;

determining a second width of the second target bounding box based on the first width and the square side length, wherein the second width is greater than or equal to the first width, and the second width is capable of exactly dividing the square side length;

determining the coordinate origin as the lower left vertex of the second target bounding box, and determining the second target bounding box based on the coordinate origin, the second length, and the second width; and dividing the second target bounding box into a plurality of squares according to the square side length.

18. The non-transitory computer readable media according to claim 13, wherein the determining the second target bounding box of the polygon comprises:

based on the target polygon not requiring coordinates meeting an exact representation condition, determining an axis-aligned bounding box of the polygon;

determining a third length and a third width of the axis-aligned bounding box;

determining a stretch ratio of the original polygon to the axis-aligned bounding box based on the third length and the third width;

performing, based on the stretch ratio, stretching processing on the polygon and the axis-aligned bounding box to obtain a stretched polygon and a stretched axis-aligned bounding box, wherein the stretched axis-aligned bounding box is a square; and determining the stretched axis-aligned bounding box as the second target bounding box.

19. The non-transitory computer readable media according to claim 18, wherein after the moving the target polygon to the position corresponding to the original polygon based on the motion vector, the instructions further configure the data processing system to perform:

determining a compression ratio based on the stretch ratio; and performing, based on the compression ratio, compression processing on the target polygon that is moved to the position corresponding to the original polygon to obtain a compressed target polygon.

20. The non-transitory computer readable media according to claim 18, wherein the determining the second target bounding box, and dividing the second target bounding box into a plurality of squares comprises:

obtaining a preset quantity of squares, and determining a square side length based on the quantity of squares and a side length of the second target bounding box; and dividing the second target bounding box into a plurality of squares based on the square side length.

21. The non-transitory computer readable media according to claim 14, wherein the determining the square among the plurality of squares that has the intersection region with the moved polygon as the target square comprises:

determining a center point of each square, and determining a square whose center point is located inside the original polygon obtained after movement as the target square; and determining a square whose center point is not located inside the original polygon obtained after movement and whose square boundary intersects with the original polygon obtained after movement as the target square.

22. The non-transitory computer readable media of claim 14, wherein the generating the target polygon based on connecting sides of the target square comprises:

determining an effective connecting side from the connecting sides of the target square, wherein the effective connecting side is not shared by two target squares;

establishing, based on a plurality of effective connecting sides, a mapping set between endpoints of the effective connecting sides and the effective connecting sides;

determining, based on the mapping set, target endpoints capable of forming a ring shape, and generating a simple polygon based on the target endpoints capable of forming the ring shape;

based on a determination that a quantity of generated simple polygons is at least two, determining an inclusion relationship between the at least two simple polygons;

determining, based on the inclusion relationship between the at least two simple polygons, at least one first simple polygon as a new outer boundary of the target polygon from the at least two simple polygons;

determining an internal hole corresponding to each first simple polygon based on a second simple polygon, wherein the second simple polygon is a polygon other than the first simple polygon in the at least two simple polygons; and generating the target polygon based on each first simple polygon and the internal hole corresponding to each first simple polygon.

23. The non-transitory computer readable media according to claim 22, wherein the determining an effective connecting side from the connecting sides of the target square comprises:

obtaining four connecting sides of each target square;

sequentially determining whether each connecting side exists in a preset effective connecting side set;

based on determining that the connecting side exists in the effective connecting side set, deleting the connecting side from the effective connecting side set;

based on determining that the connecting side does not exist in the effective connecting side set, adding the connecting side to the effective connecting side set; and determining each connecting side in the effective connecting side set as the effective connecting side.

24. A polygon processing apparatus, comprising:

one or more processors; and a non-transitory memory storing instructions that, when executed by the one or more processors, cause the polygon processing apparatus to:

obtain an original polygon, and determine a first target bounding box of the original polygon;

determine a motion vector based on the first target bounding box, and create a revised polygon by moving the original polygon and the first target bounding box based on the motion vector;

determine a second target bounding box of the revised polygon, and divide the second target bounding box into a plurality of squares, a predetermined point of the second target bounding box being a coordinate origin;

determine a square among the plurality of squares that has an intersection region with the original polygon obtained after movement as a target square, and generate a target polygon based on connecting sides of the target square, wherein connecting sides of the target polygon include at least a part of the connecting sides of the target square; and move the target polygon to a position corresponding to the original polygon based on the motion vector.

* * * * *